United States Patent
Reeve et al.

(10) Patent No.: US 7,330,927 B1
(45) Date of Patent: Feb. 12, 2008

(54) APPARATUS AND METHODOLOGY FOR A POINTER MANAGER

(75) Inventors: Rick Reeve, San Francisco, CA (US);
Richard L. Schober, Cupertino, CA (US); Ian Colloff, Los Gatos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1011 days.

(21) Appl. No.: 10/431,991

(22) Filed: May 7, 2003

(51) Int. Cl.
*G06F 12/00* (2006.01)

(52) U.S. Cl. .......................... 711/1; 711/154; 711/200; 711/221

(58) Field of Classification Search .................... 711/1, 711/110
See application file for complete search history.

(56) References Cited

U.S. PATENT DOCUMENTS 6,269,413 B1 * 7/2001 Sherlock ...................... 710/52
6,567,094 B1 * 5/2003 Curry et al. ................. 345/558

* cited by examiner

*Primary Examiner*—Jack A. Lane

(57) ABSTRACT

A pointer manager is described. The pointer manager includes write circuitry to enter, into a queue that is implemented with a first memory, a pointer value that a read hub has exhausted the use of. The pointer manager also includes read circuitry to remove, from said queue, a pointer value that is to be sent to a write hub. The pointer manager also includes write circuitry to add, to a link list that is maintained with a second memory, a pointer value that is to be sent to the write hub. The pointer manager also includes read circuitry to obtain, from said link list, a pointer value that is to be sent to a read hub.

50 Claims, 18 Drawing Sheets

FIG. 6A (SCHEDULER)

| ADDR | DATA |
|---|---|
| 1 | 9 |
| 2 | |
| 3 | 12 |
| 4 | |
| 5 | |
| 6 | 1 |
| 7 | 18 |
| 8 | EOP |
| 9 | EOP |
| 10 | |
| 11 | |
| 12 | 6 |
| 13 | 4 |
| 14 | |
| 15 | |
| 16 | |
| 17 | |
| 18 | 13 |
| 19 | |
| 20 | |

1001 →

PACKET 1 =
3 - 12 - 6 - 1 - 9

PACKET 2 =
7 - 18 - 13 - 4 - 8

APPARATUS AND METHODOLOGY FOR A POINTER MANAGER

FIELD OF INVENTION

The field of invention relates generally to networking; and, more specifically, to an apparatus and methodology for a pointer manager.

BACKGROUND

Computing systems are typically viewed as a processing core that is coupled to a plurality of "Input/Output" (I/O) devices. The processing core is often viewed as the central intelligence function of the computing system, while the I/O devices are often viewed as a means for sending information to the processing core and/or receiving information from the processing core.

A good example is a large computing system such as a UNIX based server or workstation. The processing core of a large computing system is usually implemented as a plurality of general purpose processor chips and a system memory that together execute the system's software routines. The I/O devices of a server or workstation are often implemented as some sort of "plug in" device (peripheral or otherwise). Examples of I/O devices within a server environment tend to include a graphics display, a networking interface, a data storage device (e.g., disk array unit), etc.

Large computing systems have traditionally used a bus to communicatively couple most all of the I/O devices to the processing core. For example, if a server's software requires a file from a disk drive unit, the file is transported from the disk drive unit to the processing core over a bus. Because a bus is a passive group of wires that are physically coupled to a plurality of I/O devices (or a plurality of I/O device connectors), typically, a number of different I/O devices are designed to communicate with the processing core over the same bus.

As such, system congestion (wherein two or more different I/O devices are contending for the resources of the bus) is not an unlikely occurrence. For example, if a disk drive unit and networking interface share the same bus; and, if both have information to send to the processing core at approximately the same time; then, one of the I/O devices has to wait for the other before its communication can commence (e.g., the networking adapter card, before sending information to the processing core, has to wait until the disk drive unit has sent its information to the processing core).

In cases where the processing core is of lower performance, no real loss in computing system performance is observed. That is, in a sense, if the processing core is only capable of handling the information from the I/O devices "one at a time" (e.g., if the processing core in the above example does not posses the resources to process the networking adapter card's information even if it was received "in parallel" with the disk drive unit's information), then the computing system may be said to be "processing core constrained"; and, there is no real loss in system performance as a result of the inefficiencies associated with the communication of the I/O devices over a shared bus.

The trend, however, is that processing core performance of large computing systems is outpacing bus performance. Semiconductor manufacturing technology improvements (which provide faster and more functionally robust processor chips) as well as "multi-processor" processing core designs (e.g., wherein a plurality of processor chips are designed to work together as a cooperative processing whole) have resulted in high performance processing core implementations that can simultaneously handle the emissions from two or more I/O devices.

As such, true losses in computing system performance are being observed for those high performance systems having a bus design between the processing core and the I/O devices of the system. In order to combat this trend, various system design approaches that "work around" the use of a bus as the principle means of communication between the processing core and the I/O devices have been proposed. One of these, referred to as "Infiniband", embraces the use of a switching fabric between the processing core and the I/O devices. FIG. 1 shows an example of an Infiniband or other switching fabric based architecture.

The processing core of the computing system 100 shown in FIG. 1 may be viewed as the collection of hosts $101_1$ through $101_6$. Each of the hosts $101_1$ through $101_6$ has an associated processor $103_1$ through $103_6$ that may be assumed to have its own associated memory. Each of the hosts $101_1$ through $101_6$ are coupled to a switching fabric 104 via their own host channel adapter (HCA) $102_1$ through $102_6$. In a sense, each of the HCAs $102_1$ through $102_6$ act as a media access layer for their corresponding processor (e.g., by preparing and receiving packets that are sent/received to/from the switching fabric 104).

The I/O devices of the computing system are referred to as its "targets" $107_1$ through $107_6$. Each of the targets $107_1$ through $107_6$ has an associated I/O unit $108_1$ through $108_6$ (e.g., a gateway to another network, a file server, a disk array, etc.) and target channel adapter (TCA) $109_1$ through $109_6$. Similar to the HCAs $102_1$ through $102_6$, the TCAs $109_1$ through $109_6$ act as a media access layer for their corresponding I/O (e.g., by preparing and receiving packets that are sent/received to/from the switching fabric 104).

The I/O units $108_1$ through $108_6$ are communicatively coupled to the processors $103_1$ through $103_6$ through the switching fabric 104. A switching fabric 104 is a network of switching nodes such as switching nodes $105_1$ through $105_5$. Consistent with the use and purpose of a network, the switching nodes $105_1$ through $105_5$ are responsible for directing packets toward their appropriate destination. For example, if I/O unit $108_6$ desires to send information to processor unit $103_1$, one or more packets that contain the information are directed over the switching fabric 104 from network access link $106_{12}$ to network access link $106_1$.

As such, switching node $105_5$ will direct these packets (upon their reception from access link $106_{12}$) toward switching node $105_2$ (e.g., by directing them to switching node $105_1$ which subsequently directs them to switching node $105_2$). A number of sophisticated computer architecture approaches are possible through the use of the switching fabric 104. These include (among possible others): 1) the implementation of a multi-processor computing system (because the switching fabric 104 allows the processors $103_1$ through $103_6$ to efficiently communicate with one another); 2) intelligent I/O units (because the switching fabric 104 allows the I/O units $108_1$ through $108_6$ to efficiently communicate with one another); 3) scalability (i.e., if an increase in processing performance is desired, more processors can be coupled to the network; if I/O needs to be expanded, more I/O units can be added to the fabric, with the fabric being expanded to meet the increased connectivity, and/or, if faster communication is desired through the network 104, more switches can be added to the network 104); and 4) partitioning (wherein a subset of processors are identified as being part of a unique multi-processing core resource that can operate privately).

The switching fabric 104 also provides a performance advantage over bus architectures because a large number of communications can be simultaneously carried between the various processors and I/O units. That is, a particular processor or I/O unit typically does not have to "wait" to send information until another unit has completed its own transmission of information. As a result, the various units are allowed to simultaneously inject their information into the network.

FIGURES

The present invention is illustrated by way of example, and not limitation, in the Figures of the accompanying drawings in which:

FIG. 6a shows an exemplary depiction of the register contents of a scheduler having a register ring architecture such as the scheduler of FIG. 5;

FIG. 6c shows a first exemplary depiction of the register contents of a read hub, in a high speed mode, having a register ring architecture such as the write hub observed in FIG. 11;

FIG. 6d shows a second exemplary depiction of the register contents of a read hub, in a high speed mode, having a register ring architecture such as the write hub observed in FIG. 11;

FIG. 10 shows an embodiment of a link list;

DESCRIPTION

Overview of Infiniband Switch Embodiment

Figure 1:
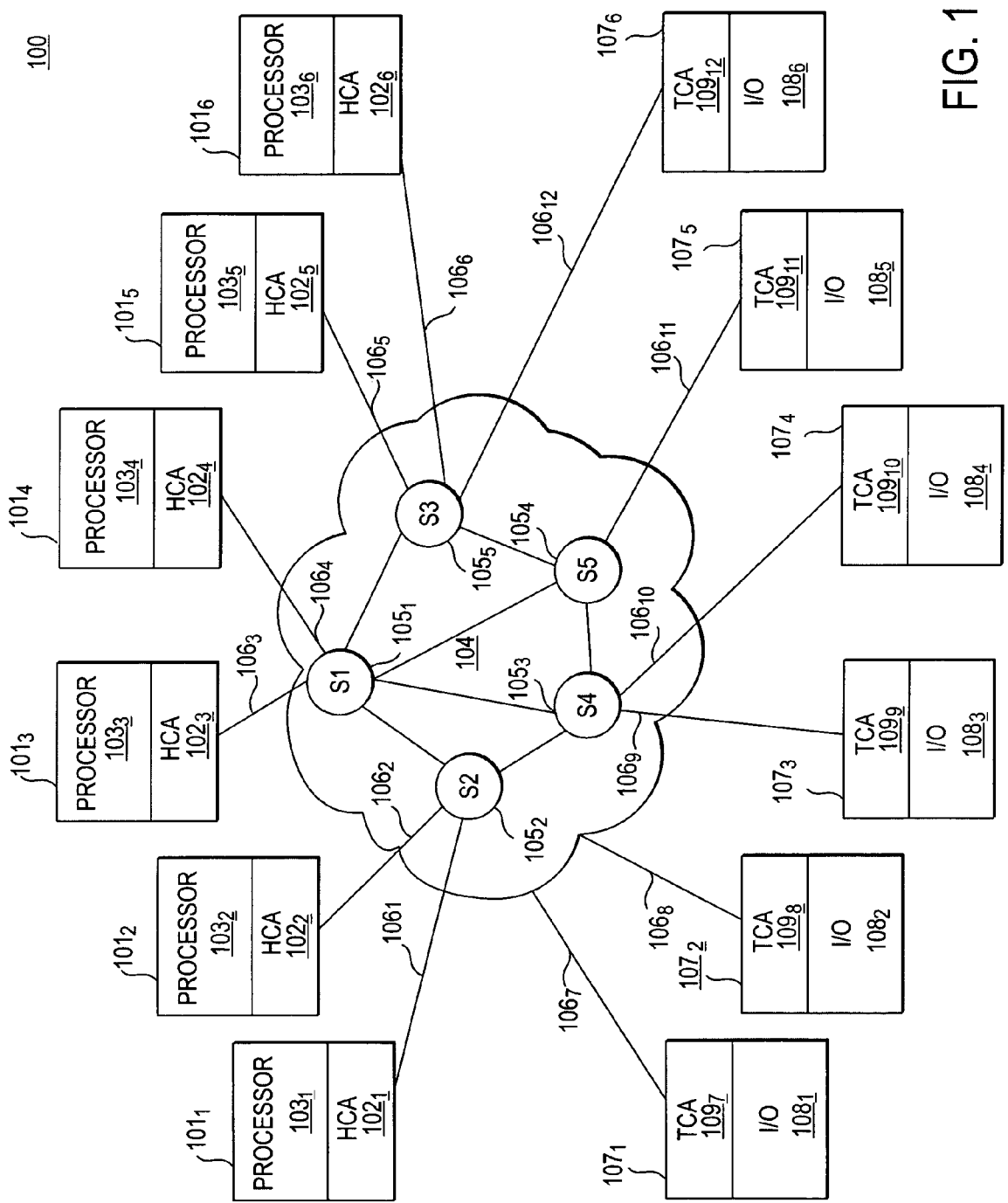
FIG. 1 shows an example of an Infiniband network.
Figure 2:
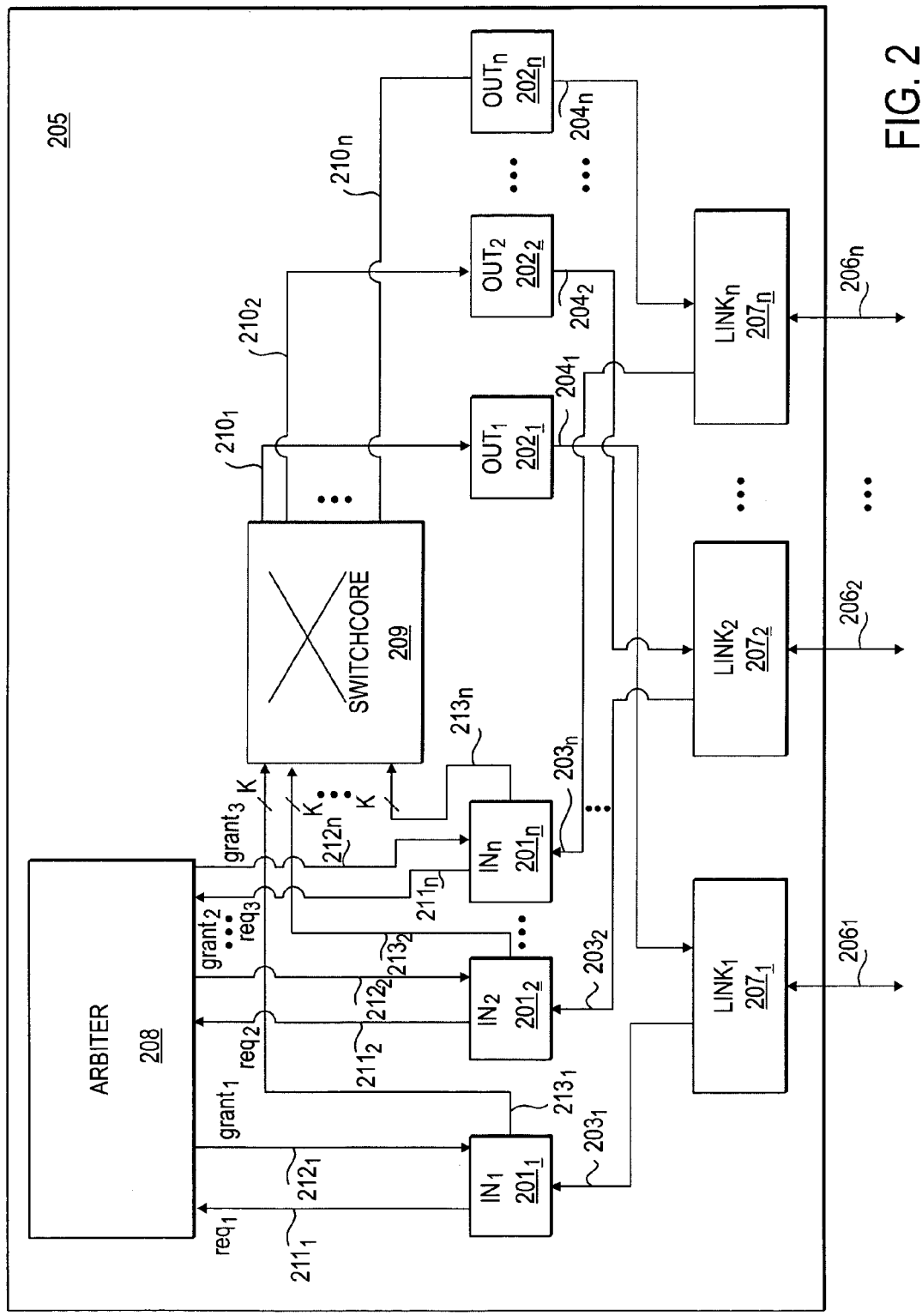
FIG. 2 shows an example of a switching node that may be used within an Infiniband network.

FIG. 2 shows an embodiment of a design 205 for a switching node. That is, switching node 205 may be viewed as an "in-depth" perspective of any of the switching nodes $105_1$ through $105_5$ shown in FIG. 1. According to the switch design of FIG. 2, a plurality of links $206_1$ through $206_n$ are coupled to the switch 205. A link is a networking line that propagates information from switch to switch within the network (or acts as an access link that allows devices outside the network to send/receive information to/from the network). Examples include copper or fiber optic cabling.

In the Infiniband scheme, currently, links are characterized as having a "4×" speed or a "1×" speed. Currently, a 1× speed link has as a 2.5 Gbps link rate (2 Gbps data rate) and is implemented as a single link that is operated at this speed. A 4× speed link may be implemented as the combination of four 1× speed links that operate in unison together (e.g., four 1× speed links collectively transport different pieces of the same packet). As such, the total speed of the 4× link is a 10 Gbps link rate (8 Gbps data rate). It is important to note, however, that as the Infiniband standard evolves, other link speeds and topologies are possible (e.g., a 4× link constructed from a single link that operates at a 10 Gbps link rate). As seen in FIG. 2, each link $206_1$ through $206_n$ has an associated link interface $207_1$ through $207_n$.

A link interface is responsible for launching packets onto a link and receiving packets from a link. Thus, for example, link interface $207_1$ launches packets onto link $206_1$ and receives packets from link $206_1$. Each link interfaces $207_1$ through $207_n$ also has an associated input port (that accepts incoming packets) and output port (that provides output packets). That is, for example, link interface $207_1$ sends incoming packets that have arrived from link $206_1$ to input port $201_1$; and, output port $202_1$ provides outgoing packets to link interface $207_1$ for transmission over link $206_1$. Alternate embodiments may deviate from the 1:1:1 link:link interface:port ratio just described above (e.g., 1:1:2, 1:1:3, etc.).

The general traffic flow for an incoming packet is to flow firstly from its link interface to its input port. Then, the packet flows from its input port to a switching core 208 (which can be constructed with a crossbar switching architecture (as suggested by FIG. 2) or other types of switching architectures). The switching core 208 is a unit that switches the incoming packet from its input port to its appropriate output port; and, in so doing, effectively converts the incoming packet to an outgoing packet. For example, if an incoming packet from link $206_1$ is to be emitted as an outgoing packet on link $206_n$, the switching core 208 will "switch" the packet from switching core input $213_1$ to switching core output $210_n$.

As such, the packet will be directed from input port $201_1$ to output port $202_n$ which effectively converts the packet from an input packet to an output packet. Note that in the switch design 205 of FIG. 2, each input port $201_1$ through $201_n$ has a plurality ("k") of output lines. That is, each input port enjoys multiple inputs to the switching core 208 In an embodiment, k=3. As such, each input port $201_1$ through $201_n$ is capable of simultaneously sending 3 different packets to the switching core 209; and, for a switch 205 where n=8, the switching core 209 corresponds to a 24×8 (input/output) switch.

The timing as to when an incoming packet is permitted to be switched by the switching core 208 is controlled by the arbiter 208. In an embodiment, for each incoming packet, a request data structure is issued by the corresponding input port to the arbiter 208. For example, if link interface 207$_1$ sends a packet to input port 201$_1$, input port 201$_1$ issues a request data structure along request interface 211$_1$ to the arbiter 208. As a request data structure is issued for each incoming packet, the arbiter 208 effectively collects these requests and is able to develop an understanding of the overall offered load being presented to switch 205.

Arbiter 208, which may be viewed as the central intelligence of the switch 205, "decides" when a particular request is to be favorably responded to. When such time arrives, a grant is directed from the arbiter 208 to the input port that issued the request. For example, for the aforementioned packet in which a request data structure was issued by input port 201$_1$, the arbiter 208 will issue a grant along interface 212$_1$ to input port 201$_1$ at a moment in time that is consistent with a moment or region of time that the arbiter 208 has decided is suitable for switching the packet through the switch 205.

In an embodiment, each of the input ports 201$_1$ through 201$_n$ are configured to have some sort of queuing or blocking so that one or more incoming packets can "wait" until the arbiter 208 decides the time is appropriate for each of their individual releases to the switching core 209. The arbiter 208 typically has designed into its intelligence the ability to determine when a grant should be provided to each incoming packet (that has had a request data structure issued to the arbiter 208 by its input port) based upon a number of factors.

The factors may include: 1) whether or not sufficient bandwidth resources currently exist at the output port and output link to which each packet is directed; 2) whether or not sufficient bandwidth resources currently exist at the switching core 209 to handle the switching of a next packet; 3) the relative priority of each packet (e.g., as based upon the source/destination of each packet and/or the packet type of each packet). The arbiter 208, depending on its particular design, may also possess functionality that determines the appropriate output port for each incoming packet (e.g., based upon the destination address embedded within each packet's header information).

As such, each request data structure that is issued from an input port to the arbiter 208 may be embedded with (or otherwise include) various specific information about its corresponding incoming packet. For example, in one embodiment, each request includes: 1) the size of the packet; 2) information that characterizes the packet (e.g., whether or not the packet is a "VL15" packet, which partition the packet belongs to, etc.); 3) the service level (SL) of the packet (which, as is known in the art, is an Infiniband packet header parameter that indicates the priority level of the packet); 4) the destination address of the packet; etc. Thus, in a sense, as the arbiter 208 makes bandwidth allocation decisions that are based upon a number of factors, such factors may be embedded with each request data structure as they pertain to its corresponding incoming packet. A more detailed discussion of various arbiter embodiments may be found in U.S. patent application Ser. No. 09/949,367, filed on Sep. 7, 2001 and entitled "METHOD AND SYSTEM TO MANAGE RESOURCE REQUESTS UTILIZING LINK-LIST QUEUES WITHIN AN ARBITER ASSOCIATED WITH AN INTERCONNECT DEVICE".

Figure 3:
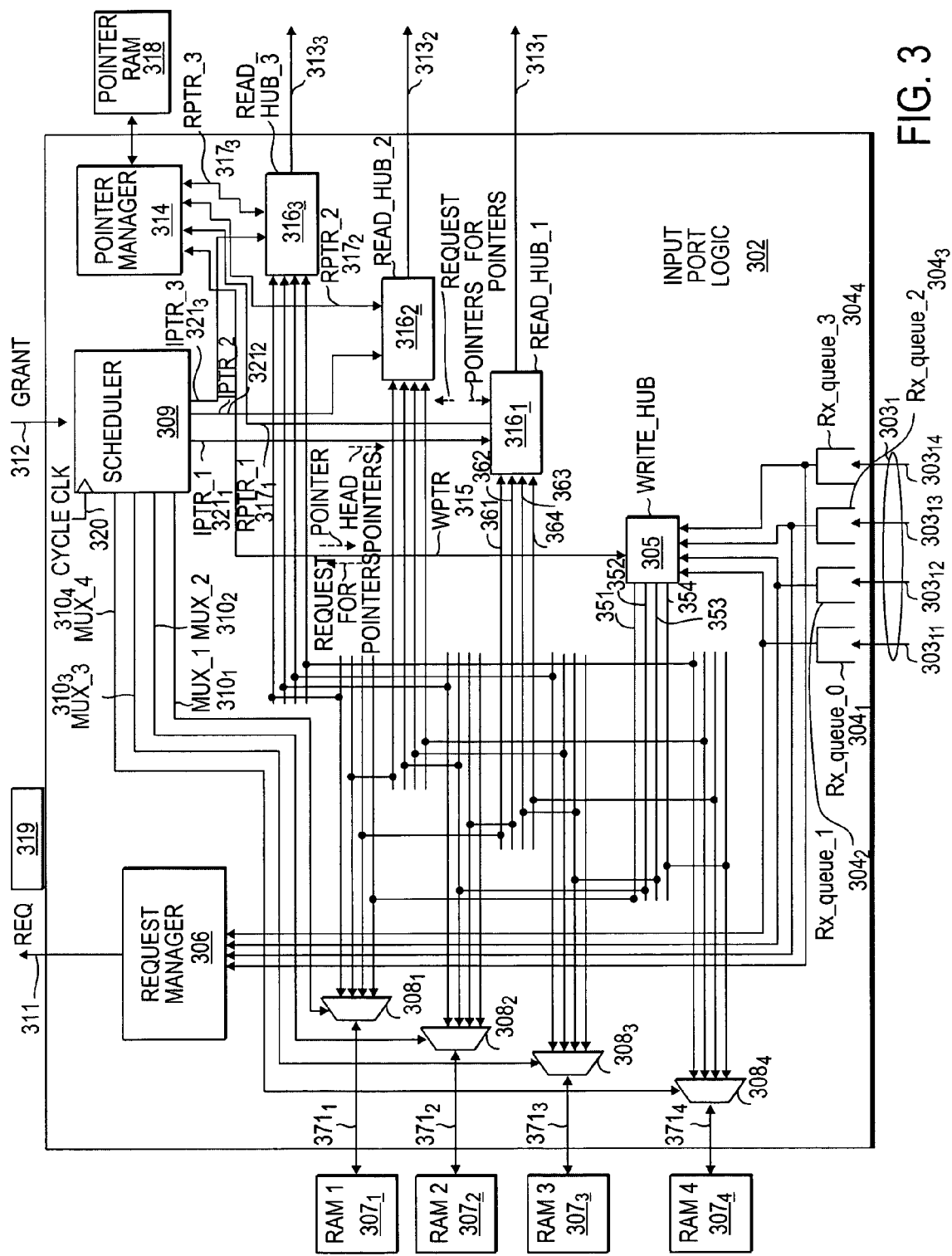
FIG. 3 shows an example of a design for an input port that may be used within the switching node observed in FIG. 2.

Before progressing to FIG. 3, note that in an embodiment each link can support up to 16 different Virtual Lanes (VLs) in the same direction (i.e., input or output). VLs effectively "break down" the traffic being transported by a link so that it can be viewed as a collection of unique traffic flows each having their own specific amount of bandwidth consumption. Typically, each VL on a link is given a number of "credits" where a credit corresponds to an amount of data allowed to be carried by the VL to which the credit is assigned. Other VL schemes besides 16 VLs per link may be developed (e.g., as a proprietary solution; or, as the Infiniband standard evolves in the future).

A link source node is typically allowed to transmit packets along a particular VL until the credit count for the VL is completely consumed. That is, each transmission of a packet along a particular VL decrements the credit count at the source node for that VL; and, if the credit count is less than the size of the next packet to be sent on that VL, no more transmissions are allowed on the link by the link source node for that VL. After a packet has been received by a link receiving node and switched through the switch core 209, it is re-transmitted by another outgoing link (and therefore another VL). In response, the link receiving node sends the credit count that was consumed by the packet back to the link source node so that the link source node's credit count for the VL can be refreshed (which permits the sending of a subsequent packet).

Overview of Input Port Operation

FIG. 3 shows an embodiment 301 of an input port that may be used for any of the input ports 201$_1$ though 201$_n$ observed in FIG. 2. In an embodiment, the link interface that feeds the input 303$_1$ performs bit recovery and byte synchronization from the incoming data stream(s) being received on the input link(s) and the request manager 306 performs packet synchronization. That is, is a sense, the link interfaces have no "packet awareness" and merely determine the individual bytes of data that they are receiving. These bytes of data are then passed along the port input 303$_1$ to the request manager 306; and, the request manager 306 determines where packets start and end from the stream of information that it receives from the link interface.

In various embodiments, the link interface may be designed to handle different link speeds. As such, the input port 301 should also be suitably designed to handle different link speeds. For example, a simple link interface may be designed to handle either one high speed link (e.g., one 4× link) or one low speed link (e.g., one 1× link). A more sophisticated link interface may be designed to handle either a high speed link or one or more low speed links. For example, as just one possible implementation, a link interface may be designed to be configured into either a high speed mode (e.g., that supports one 4× speed link); or, a low speed mode that supports individual lower speed links (e.g., a plurality of different 1× speed links).

An embodiment of the input port 301 observed in FIG. 3 can handle a link interface that is designed to provide either one 4× speed link (in its high speed mode) or up to four separate 1× speed links (in its low speed mode). It is to be emphasized, however, that an input port capable of properly handling traffic from link interfaces having different configuration characteristics that defined just above may be readily designed in light of the underlying operational principles of the input port described below. As such, unless specifically recited, the following claims should not be automatically construed as being limited to covering only those implementations designed to handle a link interface that is designed to provide either one 4× speed link (in its high speed mode) or up to four separate 1× speed links (in its low speed mode). Better said, because the description that follows describes basic underlying concepts for handling a high speed traffic stream or a plurality of different lower speed traffic streams, its application can be extended to different link speeds (e.g., other than 1×, 4×, etc.), different high speed vs. low speed configuration combinations (e.g., other than 4× vs. 1×), and/or different numbers of links to be handled (e.g., other than one high speed link, four low speed links, etc.). Furthermore, consistent with this perspective, the discussion provided herein can be applied to proprietary or future Infiniband applications; or even, applications that are not directed to the Infiniband standard.

For simplicity, the following discussion is mostly directed to input port embodiment 301 that is configured to handle a link interface that is designed to provide either one 4× speed link (in its high speed mode which may also be referred to as the "4× mode") or up to four separate 1× speed links (in its low speed mode which may also be referred to as the "1× mode"). Here, note that four separate inputs $303_{1_1}$, $303_{1_2}$, $303_{1_3}$, $303_{1_4}$, are associated with the input $303_1$ to the input port logic 302. As these inputs are provided by the underlying link interface, in a first "high speed" mode (the 4× mode) all four of the separate inputs $303_{1_1}$, $303_{1_2}$, $303_{1_3}$, $303_{1_4}$ are used together to provide the data from a single 4× speed link; and, in "low speed" mode (the 1× mode), each of the separate inputs $303_{1_1}$, $303_{1_2}$, $303_{1_3}$, $303_{1_4}$ is responsible for providing the flow of data from its own corresponding 1× speed link.

That is, in high speed mode consecutive groups of received data from the high speed link are distributed in a round robin sequence across the four inputs (e.g., such that a first group of received data is provided at input $303_{1_1}$, a second group of information is provided at input $303_{1_2}$, a third group of information is provided at input $303_{1_3}$, and a fourth group of information is provided at input $303_{1_4}$; where, the first through fourth groups of information provide a larger group of received information in its proper sequence and the same can be said for following groups of information. In low speed mode, each of the four inputs corresponds to its own unique 1× link (e.g., data from a first 1× link is received at input $303_{1_1}$, data from a second 1× link is received at input $303_{1_2}$, data from a third 1× link is received at input $303_{1_3}$, and data from a fourth 1× link is received at input $303_{1_4}$). Note that "up to" four 1× links may be active in low speed mode at one time. Thus, less than four 1× links (e.g., three 1× links; or two 1× links; or one 1× link) may actually be operating when in low speed mode. The number of links in use depends upon the configuration of the overall switch.

In a further embodiment, each input corresponds to a byte wide interface. As such, a byte of information is received at once along input $303_{1_1}$, a byte of information is received at once along input $303_{1_2}$, a byte of information is received at once along input $303_{1_3}$; and, a byte of information is received at once along input $303_{1_4}$. As such, in 4× mode, the overall input $303_1$ can be viewed as a 32 bit wide interface that provides 32 consecutive bits of received data from the 4× link; while, in 1× mode, the overall input $303_1$ can be viewed as providing four separate byte-wide interfaces. Again, less than four 1× links may be active during low speed mode. Note that in alternate embodiments the bit-width of each input may be different than 8 bits (e.g., 10 bits, 16 bits, etc.).

Figure 4:
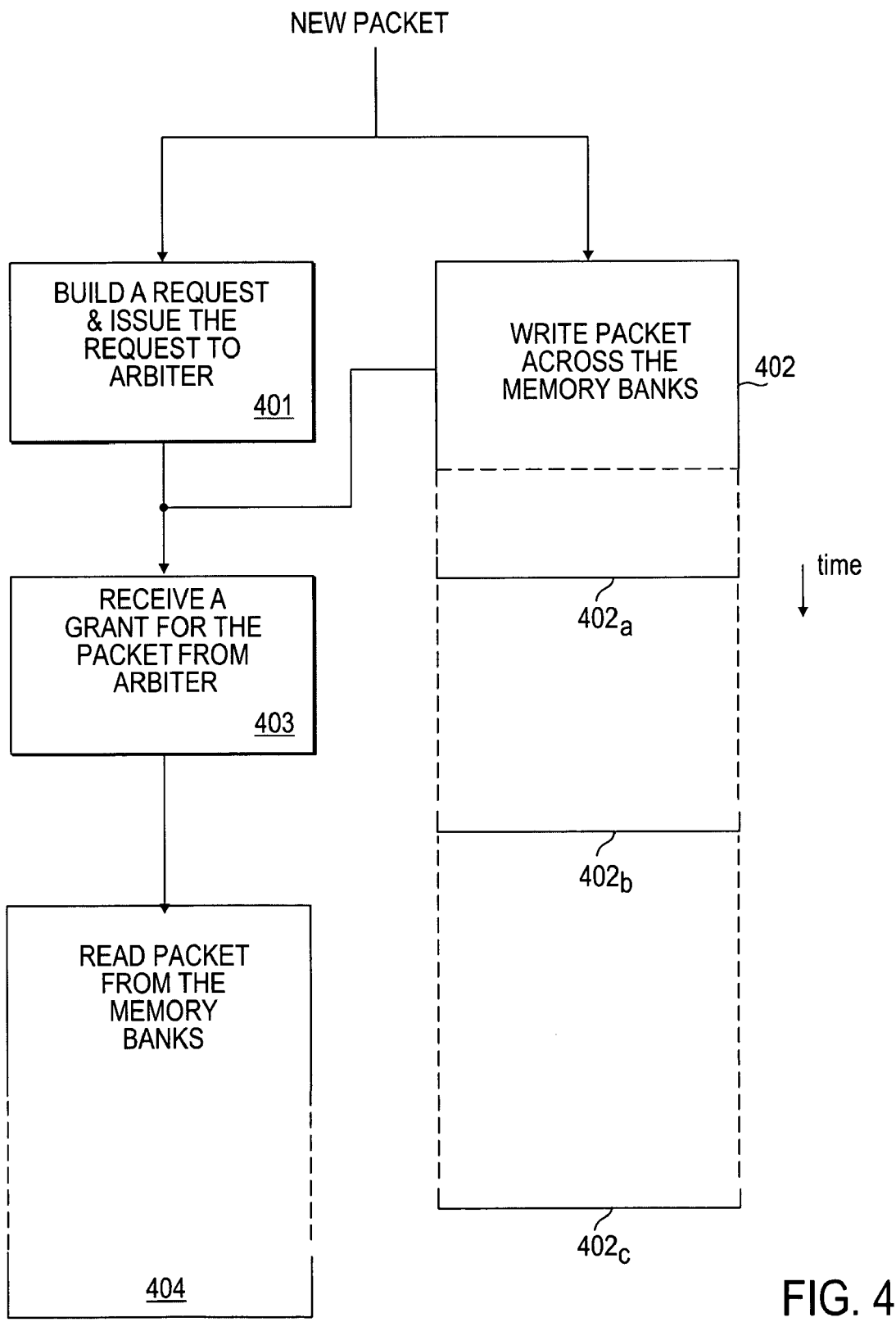
FIG. 4 shows a methodology for processing a packet that may be performed by the input port of FIG. 3.

Note that, if the link interface is configured in 4× mode, a single stream of packets will be provided by the overall input $303_1$; while, in 1× mode, up to four distinct streams of packets will be provided by the overall input 3031 (i.e., one distinct stream for each of inputs $303_{1_1}$, $303_{1_2}$, $303_{1_3}$, $303_{1_4}$). An important part of the input port 301 design is the ability to identify and separately manage the storage and retrieval of each packet whether in 4× mode or in 1× mode. FIG. 4, when viewed together with FIG. 3, helps to describe, at a high level, an embodiment of an overall processing flow that may be applied to the packets that are managed by the input port 301. According to the methodology of FIG. 4, for each newly arriving packet: 1) a request data structure 319 is built by the request manager 306 and issued 401 to the arbiter at output 311 (so as to effectively request the permission of the arbiter to send the packet to the switch core as described with respect to FIG. 2); and, 2) the newly arriving packet is written 402 across a plurality of memory banks $307_1$ through $307_4$ by a write hub unit 305 so that it can be temporarily stored while the arbiter consumes time deciding when it is appropriate to send the packet to the switch core. A write hub is collection of circuitry used to write packets into the memory banks. Various write hub approaches are discussed in more detail below.

Upon the receipt of a grant from the arbiter at input 312 (which signifies permission to forward the packet from the memory banks $307_1$ through $307_4$ has been obtained from the arbiter), a scheduler 309 helps to organize the reading of the packet from the memory banks $307_1$ through $307_4$. Here, a particular read hub unit (e.g., one of read hub units $316_1$ through $316_3$) is notified of its responsibility to read 404 the packet from the memory banks $307_1$ through $307_4$; and, the packet's information is read from the memory banks $307_1$ through $307_4$ by the notified read hub and directed to the switch core along the appropriate input port output (e.g., output $313_1$ for read hub $316_1$, output $313_2$ for read hub $316_2$, output $313_3$ for read hub $316_3$). A read hub is a collection of circuitry used to read packets from the memory banks. Various read hub approaches are discussed in more detail below. Here, from the discussion of FIG. 2, recall that each input port may have "k" outputs to the switch core 209. Further recalling that in one embodiment k=3, note that the embodiment of FIG. 3 corresponds to such an approach.

Before commencing with in-depth discussions of various architectural approaches that may be used for each of the write hub unit 305, the scheduler 309, the read hub units $316_1$ through $316_3$, and the pointer manager 314; a brief discussion of the operation of the request manager 306 and the function of link-lists will be provided. Noting that the request manager 306 is able to observe the packet streams being sent from the link interface (by being coupled to the output of each of Rx queues $304_1$ through $304_4$), the request manager 306 is configured, for each stream of packets received by the input port 301, to determine: 1) where packets start and end; 2) the VL the packet belongs to; and 3) the size of the packet. These determinations may be made by analyzing each input packet's header information. In various embodiments, this information may be used to help build the request data structure 319 that is sent to the arbiter at along output 311.

Based upon the size of the packet and the VL to which the packet belongs, the request manager 306 may also be configured to check the credit count for the packet's VL (e.g., from VL credit register space built into the request manager 306 which is not shown in FIG. 3 for simplicity) to see if sufficient credits existed on the link to receive the packet. That is, recalling the discussion provided toward the end of the preceding section, VL credits are "kept track of" so that proper link operation can be verified. Specifically, VL credit registers (which are associated with the request manager 306 and are not shown in FIG. 3 for simplicity) effectively keep a record of the credits that are available to each VL (or a subset thereof). For each packet that arrives to the input port 301, the request manager decrements the credit count of the VL that carried the packet. Upon the packet's being read out memory (in response to a grant being received from the arbiter), the credit count is refreshed.

In various embodiments, the Infiniband approach has allocated the $0^{th}$ through $14^{th}$ VLs for typical data transportation. As such, only 15 registers (or register fields) are implemented within the request manager 306 (one register/register field for each of VLs 0 through 14) for each separate packet stream the request manager 306 may have to monitor (in this case, four). The $15^{th}$ VL (upon which "VL15 packets" flow) is reserved for network maintenance/control information. As VL15 packets are considered "high priority" packets, in an embodiment, no flow control is performed and credit counts are not kept track of for a link's VL15 virtual lane. As such, in an embodiment, the request manager 306 is designed to not only recognize the arrival of a VL15 packet (e.g., from the packet's header information), but also does not refer to the credit count related register space for any VL15 packet. Instead, if a second VL15 packet arrives to the port 301 before a first VL15 packet leaves the port 301, the second packet is automatically dropped. In an alternative embodiment, a fixed number of VL15 packets can be queued before VL15 packets begin to be dropped.

After a packet begins to be observed by the request manager 306 (and the credit count is deemed sufficient for the packet), the request manager 322, then scans the packet's header information and builds a request data structure 319 for the packet. The request data structure 319 is then forwarded to the arbiter (along the request interface 311). Recall from the discussion above with respect to FIG. 2 that a request data structure may be configured to include: 1) the size of the packet; 2) information that characterizes packet; 2) the service level (SL) of the packet; 3) the destination address of the packet, etc. Each of these may be extracted from the header of the packet. In at least one embodiment, each request data structure also includes: 1) an indication as to which one of the four memory banks $307_1$ through $307_4$ where a first piece of the corresponding packet is stored; and 2) the corresponding address (referred to as a "head pointer") for that memory where the first piece can be found. Both the indication as to which memory bank and the head pointer are then included in the grant for the packet (which is received from the arbiter at grant interface 312), so that the read hub responsible for reading the packet understands where the next packet is to be found. The read hub responsible for reading the packet uses the head pointer (and the memory bank indication) to begin reading the packet from correct memory bank at the proper address.

Here, note that part of the function of the write hub is to organize a received packet into fixed size "chunks" or pieces of data. These chunks or pieces may be referred to as a "buffer" or a "buffer's worth of data". The write hub 305 is responsible for writing a buffer across the memory banks $307_1$ through $307_4$. Here, one pointer value is consumed per buffer. That is, recalling the discussion from just above, a head pointer is used to identify a memory address where the first buffer of a packet is stored. For each following buffer that is formed from the packet, a new pointer is used to point to a memory region across the memory banks $307_1$ through $307_4$ where the buffer can be stored. Here, pointers are retrieved from the pointer manager 314. The pointer manager 314 is responsible for maintaining a "link-list" for the packet. A link-list is a record of the pointer values used to store a packet.

Thus, after a packet has been completely stored across the memory banks $307_1$ through $307_4$ and a grant has been received from the arbiter for that packet, the pointer values stored in the link list may be referred to by a write hub to read the packet from memory at the correct addresses. Note that, perhaps depending on the size of the packet, if a grant for a packet is received shortly after a request was sent to the arbiter for that packet, the earlier arriving buffers of a packet may be read from the memory banks $307_1$ through $307_4$ and forwarded to the switch core while later portions of the packet are still arriving and being written into the memory banks $307_1$ through $307_4$. The term "cut-through" is used to describe this processing sequence where a packet is simultaneously being read from and written to memory as described just above. FIG. 4 shows the possibility of cut-through by border 402c (which shows the writing 402 of a packet may overlap in time with the reading 404 of a packet). Border 402a corresponds to a situation where a packet is completely written before a grant is received 403 from the arbiter; and, border 402b corresponds to a situation where a packet is completely written after a grant has been received 403 but before the packet begins to be read 404 from memory).

Scheduler

Referring to FIG. 3, note that the particular embodiment shown therein possesses one write hub 305 and three read hubs $316_1$ through $316_3$. As all four of these hubs $305_1$, $316_1$ through $316_3$ are capable of using a different one of the memory banks $307_1$ through $307_4$ within the same cycle of operation; and, as each packet is stored across each of the different memory banks $316_1$ through $316_3$, some form of organizing presence is needed to prevent the different hubs from interfering with each other's needs of the various memory banks $316_1$ through $316_3$. In the particular embodiment of FIG. 3, a scheduler unit 309 is used to control the channel select input for each of a plurality of multiplexers $308_1$ through $308_4$ such that each hub 305, $316_1$ through $316_3$ (while moving the data of a packet) gains access to the memory banks $307_1$ through $307_4$ via a round robin sequence; where, after a first memory bank (e.g., memory bank $307_1$) is accessed during a first cycle of operation, a second "next" memory bank (e.g., memory bank $307_2$) is accessed during a "next" second cycle of operation.

By identifying the first memory bank (e.g., memory bank $307_1$) as the "next" memory bank relative to the last memory bank (e.g., memory bank $307_4$) in the round robin scheme, from the perspective of one of the hubs, a different memory bank is "rotated" to the hub for its use for each cycle of operation. Over time, the hub will be provided cyclical access to all of the memory banks (e.g., BANK1, BANK2, BANK3, BANK4, BANK1, BANK2, BANK3, BANK4, etc.). By allowing each hub to have access to a different memory bank during any same cycle of operation, all four hubs can simultaneously enjoy rotated access to each of the memory banks. Here, the scheduler unit 309 in the embodiment of FIG. 3 is responsible for controlling the multiplexers $308_1$ through $308_4$ in a fashion that is consistent with the scheme described just above. That is, under full loading conditions, not only is each multiplexer configured to give memory access to a different hub during any same cycle of operation (e.g., during a first cycle: 1) multiplexer $308_1$ gives access to read hub 3 $316_3$; 2) multiplexer $308_2$ gives access to read hub 2 $316_2$; 3) multiplexer 3083 gives access to read hub 1 $316_1$; and, 4) multiplexer $308_4$ gives access to the write hub 305); but also, each multiplexer is configured to select hubs (giving them access to its corresponding memory) in round robin fashion. In the embodiment of FIG. 3, the scheduler 309 is responsible for providing the correct channel select values across the multiplexer channel select lines $310_1$ through $310_4$ to realize this scheme.

Figure 5:
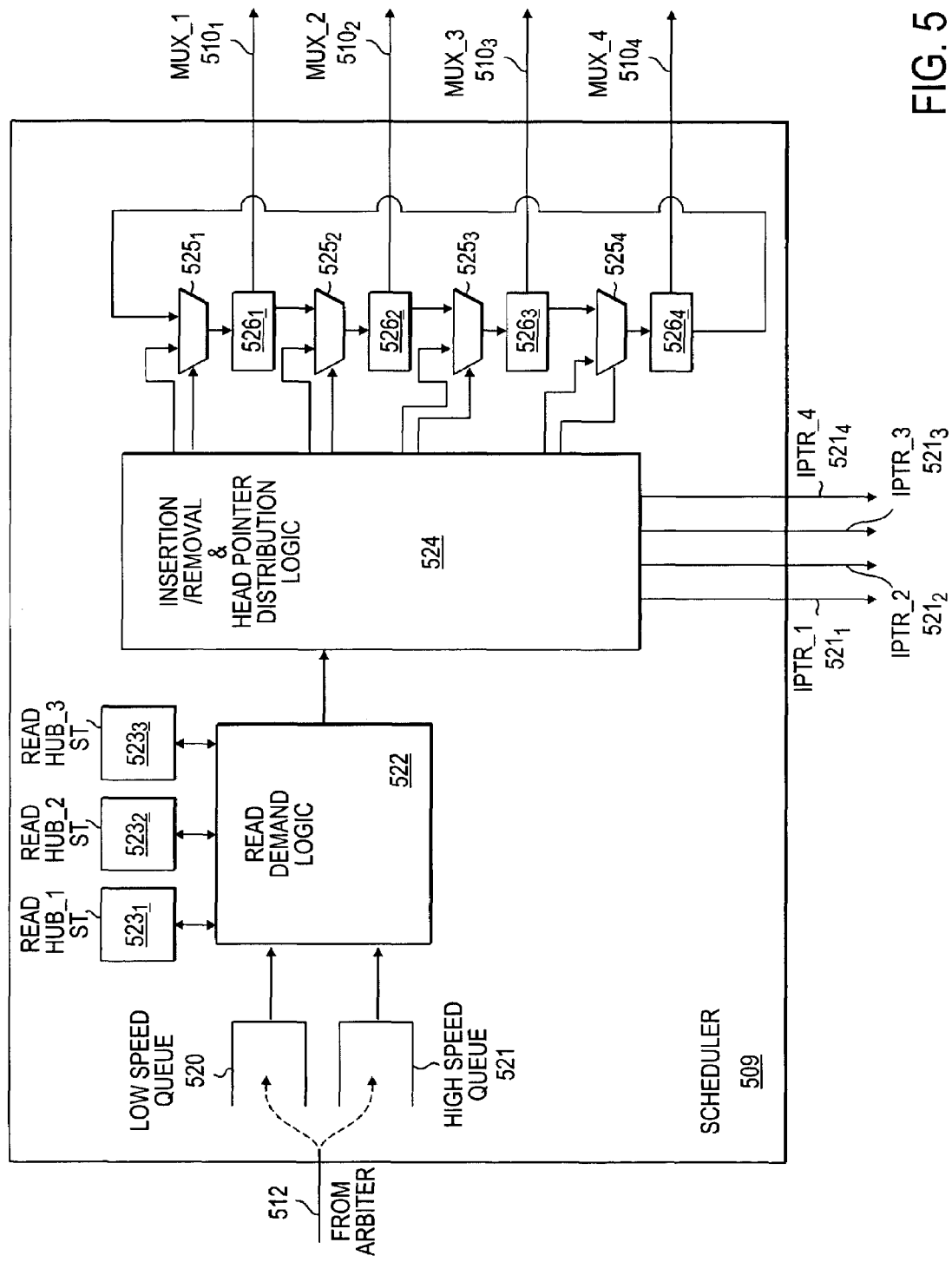
FIG. 5 shows an example of a design for a scheduler that may be used within the input port of FIG. 4.

FIG. 5 shows an embodiment of a scheduler unit 509 that can be used to implement the scheduler unit 309 of FIG. 3. The read demand logic 522 and associated circuitry 520, 521, $523_1$ through $523_3$ comes into play for the reading of packets from the memory banks. A discussion of the read demand logic 522 and its associated circuitry 520, 521, $523_1$ through $523_3$ will be provided further below in a section entitled "Read Operation". Referring to the scheduler unit embodiment 509 of FIG. 5, note that ring of registers $526_1$ through $526_4$ is observed. A ring of registers (which may also be referred to as a "register ring", a "register ring architecture" and the like, etc.) is an arrangement of registers where: 1) the contents of each register can be shifted to "next" register in the ring; and, 2) the continuous shifting of the contents through registers causes the contents to circulate through the registers. The circulation is caused by a feedback path that flows from the last register to the first register in the ring (e.g., as observed from by the feedback path that flows from register $526_4$, through multiplexer $525_1$, and into register $526_1$). Here, the circulation of the register contents is used to implement the round robin scheduling scheme that was just discussed above.

Insight into how the register ring can be used to implement a round robin scheduling scheme can be gleaned by referring to both FIGS. 5 and 6a. FIG. 6a shows the circular rotation of the register contents over time. The columns of the chart observed in FIG. 6a correspond to a consecutive string of operational cycles that the time of operation of the input port is organized into. The rows of the chart observed in FIG. 6a correspond to the contents of the registers $526_1$ through $526_4$ (or the outputs MUX1 $510_1$ through MUX4 $510_4$ that are respectively derived from them). The rows have been labeled according to the memory bank that is accessed by way of the contents held within the register that each row corresponds to. That is, referring briefly to FIGS. 5 and 3, register $526_1$ controls access to the first memory bank (BANK 1) $307_1$, register $526_2$ controls access to the second memory bank (BANK 2) $307_2$, register $526_3$ controls access to the third memory bank (BANK 3) $307_3$, and register $526_4$ controls access to the fourth memory bank (BANK 4) $307_4$.

The fact that the registers control access to the memory banks as described above can be recognized by realizing that the output nodes MUX1 $510_1$ through MUX4 $510_4$ of the scheduler 509 of FIG. 5 corresponds to the output nodes MUX1 $310_1$ through MUX4 $310_4$ of the scheduler 309 of FIG. 3. As such, in the implementation of FIG. 5, the contents of register $526_1$ correspond to the logical value that is applied to the channel select input $310_1$ of the first multiplexer $308_1$; the contents of register $526_2$ correspond to the logical value that is applied to the channel select input $310_2$ of the second multiplexer $308_2$; etc. Referring now to FIGS. 3 and 6a, note that each of the four multiplexers $308_1$ through $308_4$ have the same input channel design. That is, each of the four multiplexers $308_1$ through $308_4$ have: 1) their first input channel coupled to read hub_3 $316_3$; 2) their second input channel coupled to read hub_2 $316_2$; 3) their third input channel coupled to read hub_1 $316_1$; and, 4) their fourth input channel coupled to the write hub 305.

As such, a specific channel select value will have the same effect regardless as to which multiplexer's channel select input receives it. That is, for example, if a value of "11" is placed upon the channel select input of any of the multiplexers $308_1$ through $308_4$ causes the multiplexer to select its fourth input; then, rotating a value of "11" across the channel select lines $310_1$ through $310_4$ will cause the write hub to enjoy round robin access to the memory banks as described above. Referring then to FIGS. 3, 5 and 6a and continuing with this example, note that if the logical value for "W" corresponds to "11"; then, FIG. 6a accurately represents how the channel select value for the selecting of the write hub 305 can be rotated across the channel select lines $310_1$ through $310_4$ (so as to provide round robin access to the memory banks $307_1$ through $307_4$ for the write hub 305) by rotating the "W" value forward in the register ring according to the register sequence $526_1$, $526_2$, $526_3$, $526_4$, $526_1$, $526_2$, ... etc. where one shift of the "W" value occurs per cycle.

FIG. 6a also demonstrates how the channel select values for selecting the read hubs $316_1$ through $316_3$ are circulated through the scheduler's register ring. That is, the label "Hub 1" in FIG. 6a corresponds to a data structure value that would cause any of multiplexers $308_1$ through $308_4$ to give its corresponding memory bank access to Read_Hub_1 $316_1$. Similarly, the label "Hub 2" in FIG. 6a corresponds to a data structure value that would cause any of multiplexers $308_1$ through $308_4$ to give its corresponding memory bank access to Read_Hub_2 $316_2$; and, the label "Hub 3" in FIG. 6a corresponds to a data structure value that would cause any of multiplexers $308_1$ through $308_4$ to give its corresponding memory bank access to Read_Hub_3 $316_3$. From the exemplary scheduling example of FIG. 6a, note that Cycles 12 through 16 demonstrate how each of the four hubs $316_1$ through $316_3$ and 305 can share each of the four memory banks $307_1$ through $307_4$ via their round robin memory bank accesses that are out-of-phase with one another.

Note that each of the read hub labels ("Hub_1", "Hub_2", "Hub-3") are also labeled with a speed label of "LS" or "HS". Here, "LS" represents "low speed" and "HS" represents "high speed". In various embodiments, each of the read hubs $316_1$ through $316_3$ are capable of either low speed or high speed operation. Having a read hub capable of operating in a low speed mode or a high speed mode means that the read hub is capable of reading packets from memory at either of two speeds. In a further embodiment, the low speed mode is for reading packets from memory that will be emitted (e.g., after they are switched through the switch core) as an output packet along a low speed (e.g., 1× speed) Infiniband link; and, the high speed mode is for reading packets from memory that will be emitted (e.g., after they are switched through the switch core) as an output packet along a high speed (e.g., 4× speed) Infiniband link.

More insight to this perspective by referring back to FIG. 2. FIG. 2 shows an exemplary architecture for a networking switch. Note that the networking switch has a plurality of outgoing links $206_1$ through $206_n$. In various configurations, some of these outgoing links $206_1$ through $206_n$ may be high speed outgoing links (e.g., 4× speed outgoing links) whereas others may be low speed outgoing links (e.g., 1× speed outgoing links). Given that an input (e.g., input port $201_1$ may receive packets destined to one or more of the high speed outgoing links as well as receive packets destined to one or more of the low speed outgoing links, designing an input port so that packets destined for a high speed outgoing link are sent to the switch core 209 at a higher speed than those packet destined for a low speed outgoing link allows for a more efficiently designed switch 205.

Better said, if packets destined for a high speed outgoing link are sent to the switch core at too slow a speed, the output port (e.g., output port $202_1$) responsible for handling the output packet may not be able to feed the high speed outgoing link at a proper rate (e.g., the outgoing high speed link may become starved). Similarly, if packets destined for a low speed outgoing link are sent to the switch core at too high a speed, the output port (e.g., output port $202_1$) responsible for handling the output packet may become overrun with data because the outgoing link could not bleed off traffic from the output port at a fast enough rate. As such, designing an input port to be able to send traffic to the switch core 209 at either of a pair of speeds allows traffic flow rates through the switch to be modulated in accordance with the traffic flow rates that emanate from the switch itself. As such, wasteful under-run or over-run conditions are more easily avoided.

Referring now to FIGS. 3 and 6a, in an embodiment, each read hub $316_1$ through $316_3$ is capable of reading packets from the memory banks $307_1$ through $307_4$ at a high speed rate or a low speed rate so that the output ports that ultimately receive these packets receive them at a rate that is commensurate with their own outgoing link speeds. According to the scheduling diagram of FIG. 6a, the "LS" and "HS" labels indicate that read hub_1 $316_1$ is configured as a low speed hub while read hubs 2 and 3 $316_2$, $316_3$ are each configured as high speed hubs. In at least one embodiment, to say that a read hub is configured as a high speed read hub means that the read hub is capable of reading a single stream of packets at least at a 4× Infiniband speed. In a further embodiment, to say that a read hub is configured as a low speed hub means that the read hub is capable of reading four separate streams of packets each of which are read at least at a 1× Infiniband speed. Note that the total bandwidth capability of either mode is a sufficient for a 4× speed rate of traffic flow (e.g., 1×4×=4×; or, 4×1×=4×).

Figure 6B:
FIG. 6b shows an exemplary depiction of the register contents of a read hub, in a low speed mode, having a register ring architecture such as the read hub observed in FIG. 11.
Figures 6C, 6D:
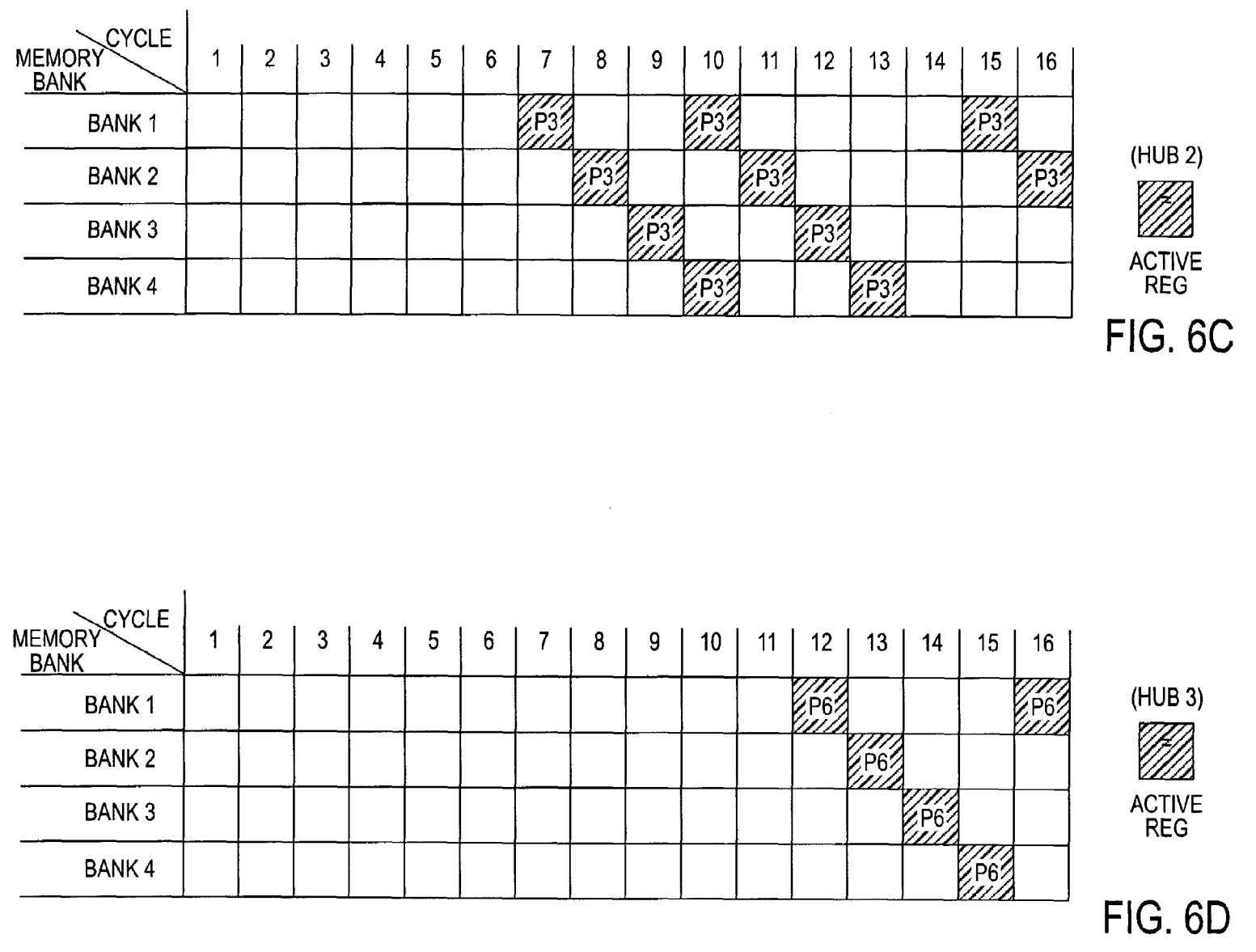

FIGS. 6b through 6d relate to the operation of each of read hubs $316_1$ through $316_3$, respectively (whereas, as mentioned just above, read hub_1 $316_1$ is configured as a low speed hub while read hubs 2 and 3 $316_2$, $316_3$ are each configured as high speed hubs). However, before commencing a more thorough discussion of an embodiment of the operation of the read hubs $316_1$ through $316_3$ themselves, note that it may be desirable to have the read hubs be configured into a high speed mode or a low speed mode "on the fly". That is, for example, if the input port is asked to handle a steady stream of packets that are only destined for low speed outgoing links—it would be efficient to configure every read hub as a low speed read hub. Then, continuing with this same example, if the same input port was suddenly asked to process nothing but packets destined for high speed outgoing links—it would suddenly become more efficient to configure every read hub as a high speed read hub. This simple example shows that it may be more efficient to allow an input port to adjust the number of read hubs devoted to a particular speed mode in light of changes that arise in the characteristics of the traffic (i.e., "traffic conditions") it is asked to handle over time.

FIG. 5 shows an embodiment of a scheduler 509 that can, over time, tweak the number of read hubs that are devoted to a particular speed in light of present or expected trafficking conditions. More particularly, the scheduler of FIG. 5 gains insight into how many "high speed" packets (i.e., packets to be read a high rate of speed from memory) and how many "low speed" packets (i.e., packets to be read a high rate of speed from memory) are to be read from memory in the near future. Based at least partially upon the number of high speed and low speed packets that are to be read from memory in the near future, the scheduler configures an appropriate number of high speed read hubs and an appropriate number of low speed read hubs. Here, referring to FIGS. 3 and 5, recall the a grant is received from the arbiter (e.g., along interface 312, 512). In an embodiment, the grant indicates the speed at which the packet should be read from memory. Note that this is consistent with the function of the arbiter whose role it is to oversee the traffic flows throughout the switch core as a whole. Better said, as the function of the arbiter involves an understanding of the applicable input and output rates (e.g., incoming link speeds and outgoing link speeds), the arbiter should be able to recognize the applicable outgoing link speed for a packet simply by recognizing the output port and/or destination address of a packet. As such, each grant provided to an input port can readily be adapted to indicate whether the packet should be read from memory at high speed or at low speed.

Referring to FIG. 5 then, note that a pair of queues 520, 521 are configured to receive and enqueue the stream of grants that are sent from the arbiter at interface 512. Here queue 520, the low speed queue 520, collects those grants having been specified by the arbiter to be read from memory at low speed (e.g., a 1× speed); and, queue 521, the high speed queue 521, collects those grants having been specified by the arbiter to be read from memory at high speed. The read demand logic 522, by making reference to the relative population of these queues 520, 521 and the state of each read hub (via read hub state registers $523_1$ through $523_3$) decides upon: 1) which hubs should be actively reading a packet from memory; and, 2) of these active read hubs, how many should be configured in low speed mode and how many should be configured in high speed mode.

The read demand logic 522 activates a particular read hub (e.g., Read_Hub_1 $316_1$ of FIG. 3) by placing its corresponding data structure (e.g., "Read_Hub_1" as observed in FIG. 6a) into one of the scheduler's registers $526_1$ through $526_4$. The data structure will then circulate through the ring so as to give its corresponding read hub round robin access to the memory banks. When a read hub is to be deactivated, for the time being, it is removed from the ring. Here, the read demand logic 522 informs the ring control logic 524 which data structures should be entered into the ring and which data structures should be removed from the ring so that the appropriate read hubs are active over time in light of the read demand logic's decisions.

Figure 7:
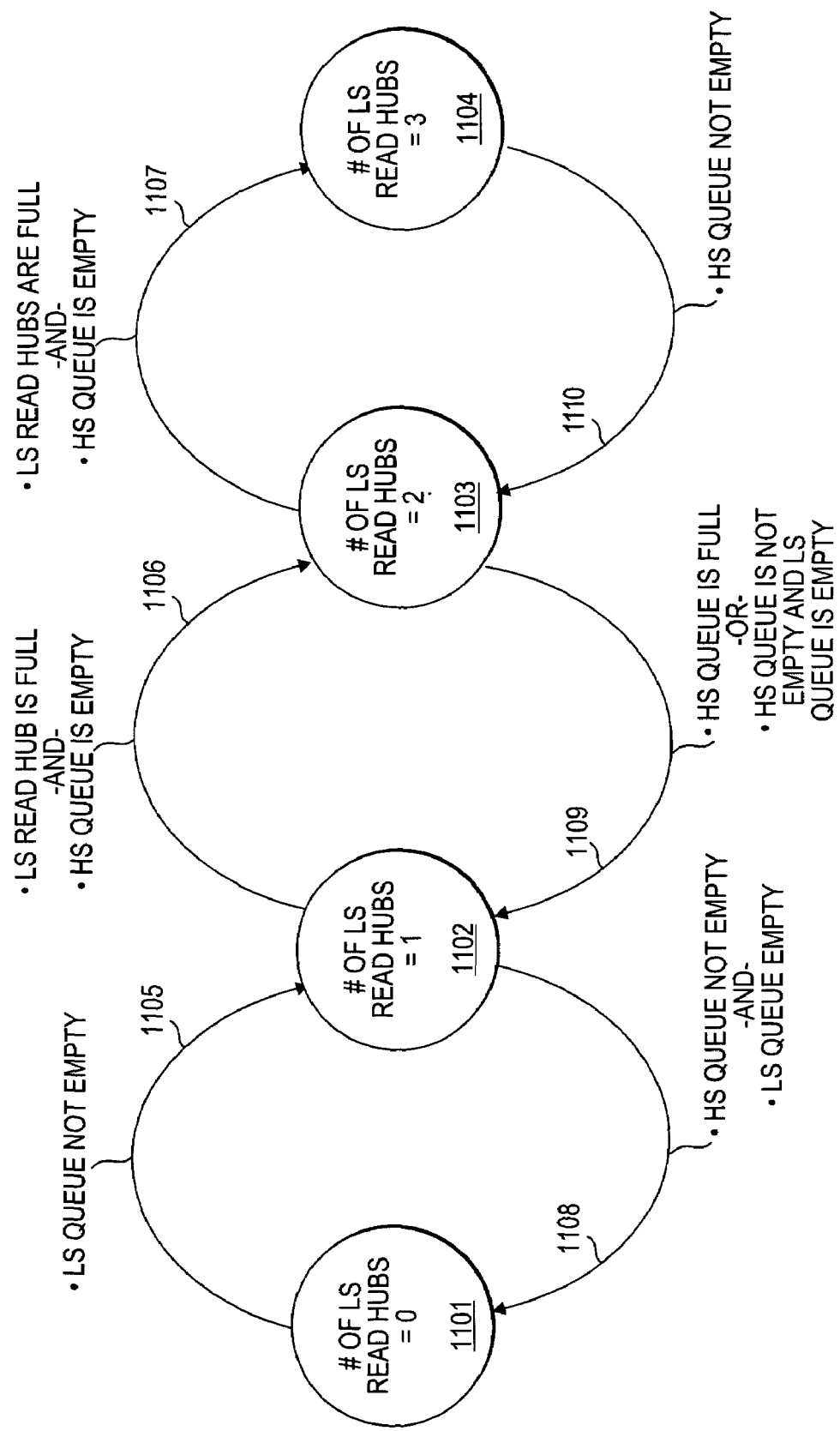
FIG. 7 shows an embodiment of a state machine that may be used by a scheduler to determine how many write hubs should be set to a particular speed mode in light of current traffic conditions.

FIG. 7 presents an embodiment of a state machine that is executed by the read demand logic to determine how many low speed read hubs should be active. Note that, consistent with the embodiment observed in FIG. 3, the maximum number of allowable low speed read hubs is three 1104. Here, the maximum number of allowable high speed read hubs is (3—(the state of FIG. 7)). Thus, if the state machine of FIG. 7 is at state 1104 there are no high speed read hubs, if the state machine of FIG. 7 is at state 1103 there is one allowable high speed read hub, etc. Assuming that the initial "start up" state is state 1101, the number of active read hubs will be set to "one" 1102 in response to the first low speed grant being enqueued in the low speed queue 1105 (recalling the presence of low speed 520 and high speed 521 queues). The number of active low speed hubs will remain at "one" unless: 1) the high speed queue becomes non-empty and the low speed queue becomes empty 1108 (in which case the number of low speed hubs will return to "zero" 1101); or, 2) the one active low speed read becomes "full" and the high speed queue becomes empty 1106 (in which case the number of low speed hubs will set to "two" 1103).

Here, a low speed read hub is deemed "full" if it is reading traffic at its maximum rate. In the embodiments written at length herein, this corresponds to a low speed read hub that is currently entertaining the management of four separate "1×" packet streams. As will be described in more detail below, for read hubs that are implemented with their own register ring architecture, a "full" read hub will have all its registers populated within its register ring. Note that state transition 1106 allows low speed grants to be built up within the low speed queue 520 while keeping the versatility of allowing any of 0, 1, or 2 active high speed hubs (depending on the rate at which high speed grants are being sent from the arbiter). That is, even in the face of a throttling up of low speed grants from the arbiter, the number of active low speed hubs is kept at one 1102 unless the active low speed queue 520 becomes full and the high speed queue 521 becomes empty 1106.

Continuing with a discussion of the state machine of FIG. 7, should the state of the number of active low speed read hubs reach "two" 1103, the number remains at two unless: 1) both of the active low speed read hubs become full and the high speed queue 521 becomes empty 1107 (in which case the number of active low speed read hubs is set to "three" 1104); or, 2) the high speed queue 521 becomes full 1109 (in which case the number of active low speed read hubs is reduced to "one" 1102); or, 3) the low speed queue 520 becomes empty while the high speed queue is non-empty 1109 (in which case the number of active low speed read hubs is reduced to "one" 1102). Finally, should the number of active low speed red hubs become equal to "three" 1104, the number remains at "three" unless the high speed queue becomes non-empty 1110 (in which case the number of active low speed read hubs is reduced to "two" 1103).

Referring to FIG. 5, note the presence of read hub state register $523_1$ through $523_3$. In an embodiment that can be used consistently with the state machine embodiment of FIG. 7, each read hub state resister informs the read demand logic 522 whether or not its respective read hub is: 1) active or inactive; 2) high speed (e.g., 4×) or low speed (e.g., 1×) (if the respective read hub is active); and 3) "full" (if the respective read hub is active and configured to be in low speed mode). From this information, as well as the state of the low speed and high speed queues 520, 521, a state machine (such as the state machine observed in FIG. 7) can be executed by the read demand logic 522 for the purpose of deciding which read hubs should be active and, of those, which should be configured in low speed mode.

In an embodiment, each grant for a packet that is entered into one of the queues 520, 521 includes the head pointer for that packet. Once a packet is scheduled to be read by a particular read hub, as part of the scheduling process, the scheduler forwards the head pointer for the packet to the particular read hub that is to read the packet. Here each of outputs $521_1$ through $521_4$ run to a different read hub for the purpose of allowing a head pointer to be forwarded to any read hub. Here, note that each of outputs $521_1$ through $521_4$ can be viewed as corresponding to scheduler outputs $321_1$ through $321_4$ of FIG. 3. Referring to FIG. 3, the discussion of the present section focused upon the scheduler portion 309 of the input port 301. The immediately following section focuses on the pointer manager 314 and the pointer RAM 318.

Pointer Management

Figure 8:
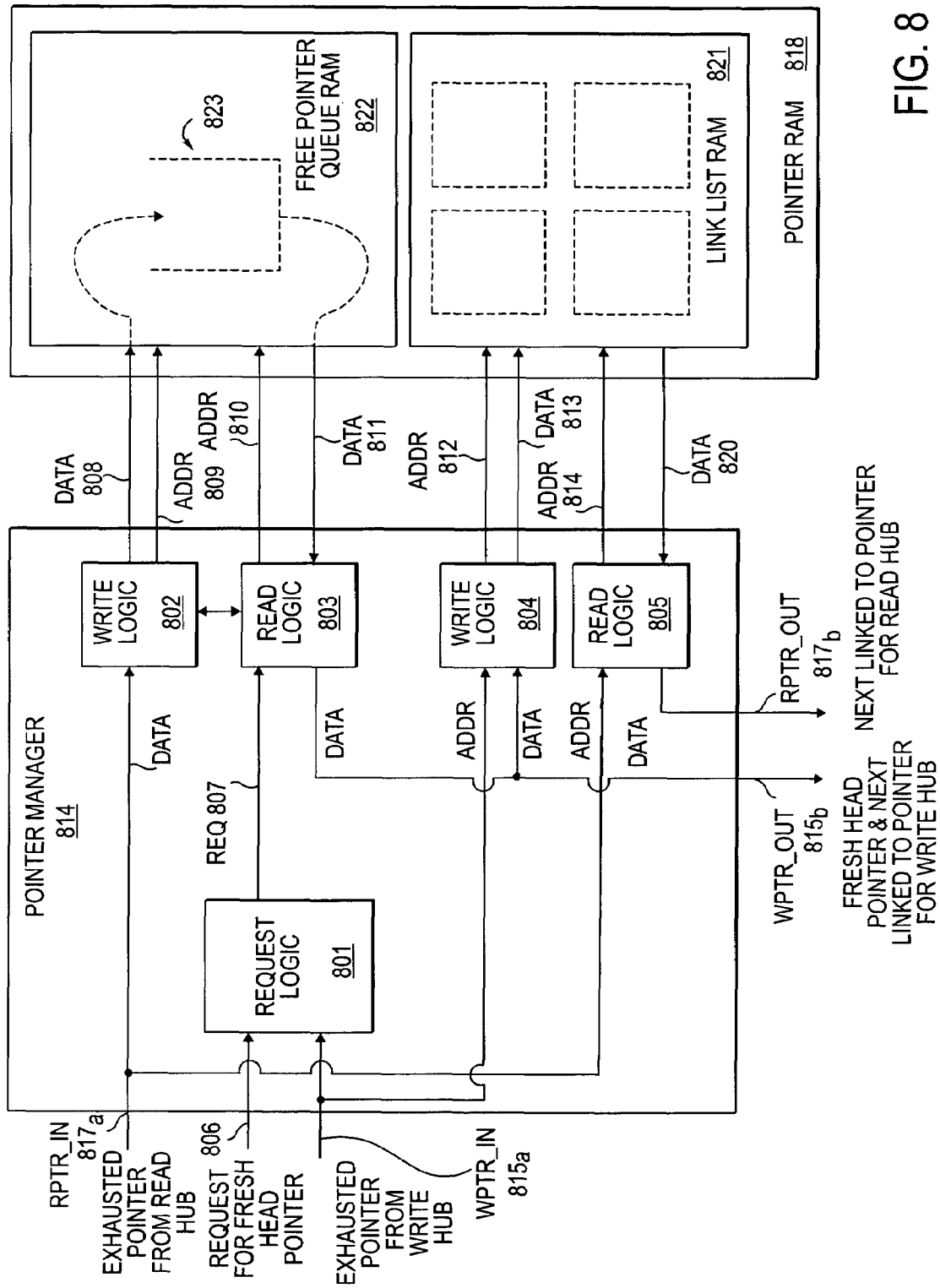
FIG. 8 shows an embodiment of a design for a pointer manager such as the pointer manager observed in FIG. 3.
Figure 9:
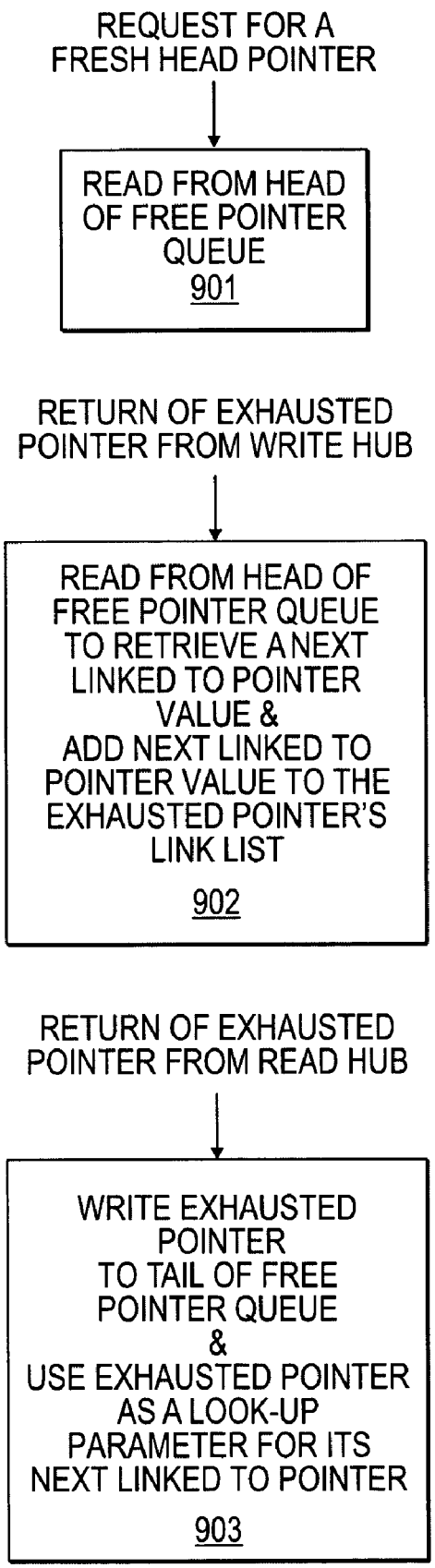
FIG. 9 shows a trio of methodologies that can be performed by the pointer manager observed in FIG. 8.

FIGS. 8, 9 and 10 relate to a discussion of the pointer manager 314 and the pointer manager RAM 318 that is observed in FIG. 3. Upon the arrival of a packet, the write hub 305 will eventually receive (at the WPTR interface 315) a fresh "head" pointer that defines the memory address where the packet should first begin to be written into the memory banks $307_1$ through $307_4$. Note that the initial directive to send a fresh head pointer to the write hub 305 may be a signal, command or other communicative technique that exists between the request manager 306 and the pointer manager 314. That is, for example, upon recognition of a newly arriving packet, the request manager 306 may send some form of communication to the pointer manager 314 that the pointer manager interprets as a command to send a fresh head pointer to the write hub 305. For simplicity, such communicative capabilities are not shown in FIG. 3.

Upon reception of the fresh head pointer from the pointer manager 314, the write hub 305 will begin to write consecutive pieces of the packet in a round robin fashion across the memory banks $307_1$ through $307_4$. At some point the head pointer for the packet will be exhausted. That is, at some point all that could be written with respect to the issuance of the head pointer will be written into memory and the write hub 305 will need "another" pointer in order to continue the successful writing of the packet into memory. In various embodiments, the write hub 305 employs more than one memory address per pointer value that is received from the pointer manager 314. For example, in a further embodiment, four usable memory addresses are used by the write hub 305 per pointer value received from the pointer manager 314 (e.g., each pointer value from the pointer manager 314 is of the form XXX . . . XX00; and, the write hub is configured to use each of memory addresses XXX . . . XX00, XXX . . . XX01, XXX . . . XX10, and XXX . . . XX11 in response to the pointer value's reception).

Here, once each memory address for the pointer value has been used, the pointer value is said to be "exhausted" and the write effectively requests another pointer value in order to continue writing the packet. In an embodiment, the write hub 305 is configured to "return" the exhausted pointer value to the pointer manager 314. The pointer manager 314 interprets the returned pointer value as a request for a new pointer value and sends a "next linked to" pointer value to the write hub as its response to the write hub's request. Here, the pointer manager 314 maintains a link list for the packet within the pointer RAM 318. A link list is a record held within a memory (such as pointer RAM 318) that effectively links together each pointer value used for the same packet (e.g., by keeping, at each address that corresponds to a pointer value used for a packet, a data value that corresponds to the "next" pointer value that was used for the packet (from the perspective of the pointer value that the data value's address corresponds to)).

FIG. 8 shows an embodiment of a pointer manager 814 that can operate as described just above. The pointer manager 814 communicates with the pointer RAM 818; and, the pointer RAM is further constructed from a pair of RAMs: 1) a link list RAM 821; and, 2) a free pointer queue RAM 822. The link list RAM 821 stores a link list for each packet stored in the memory banks $307_1$ through $307_4$. An embodiment of the contents of the link list pointer RAM 821 is shown in FIG. 10 and will be described in more detail below. The free pointer queue RAM 822 is used to implement a simple first-in-first-out (FIFO) queue 823 that effectively queues "free" pointer values.

Here, a free pointer value is a pointer value that points to "free space" in the memory banks $307_1$ through $307_4$ of the input port. In an embodiment, a free pointer corresponds to an address value for memory banks $307_1$ through $307_4$ where a portion of a packet can be written without writing over a portion of another packet that has not yet been read from memory banks $307_1$ through $307_4$. According to this definition, the pointer values held within the free pointer queue therefore correspond to those locations in the memory banks $307_1$ through $307_4$ that: 1) are not presently being used to store a portion of a packet; or, 2) are presently holding "stale" data that can be written over.

Some basic functions of the pointer manager 814 (some of which have already been described above) are illustrated in FIG. 9. These basic functions include: 1) the response 901 to the reception of a request for a fresh head pointer; 2) the response 902 to the reception of an "exhausted" pointer value from the write hub 305; and, 3) the response 903 to the reception of an "exhausted" pointer value from one of the read hubs $307_1$ though $307_4$. Referring to FIGS. 8 and 9, if a request for a fresh head pointer (e.g., as made by the request manager 306 in response to the arrival of a new packet) is received by the request manager 814 at input 806, the pointer manager 814 reads 901 the fresh head pointer from the head of the free pointer value queue 823. According to the pointer manager embodiment 814 observed in FIG. 8, this entails triggering a request (along request signal line 807) to the read channel logic 803 that interfaces to the free pointer queue RAM 822. In response to the request, the read channel logic 803 reads the "next" free pointer value from the head of the queue 822. The pointer value is then sent to the write hub 305 at output 815b.

If the write hub returns an exhausted pointer value to the pointer manager 814 (e.g., at input 815a), a pair of sub-actions occur 902. The first sub-action involves the reading of the next "free" pointer from the head of the free pointer queue 823 (which, again, entails triggering a request (along request signal line 807) to the read channel logic 803 that interfaces to the free pointer queue RAM 822). The second sub-action involves constructing the next portion of the link list for the packet that the returned, exhausted pointer value was used to store into the memory banks. The constructing of the next portion of the link list involves storing, into the link list RAM 821, the "next" free pointer value (that was just retrieved from the head of the free pointer queue 822 in response to the return of the exhausted pointer) at the address specified by the returned, exhausted pointer value.

FIG. 10 helps demonstrate the second sub-action in more detail. FIG. 10 illustrates a simplistic perspective 1000 of the link-list RAM 821 of FIG. 8. Here, a pair of links that track the pointer values used to store a pair of packets, respectively, are observed. The first packet is stored in the memory banks with pointer values 3, 12, 6, 1, 9; and, the second packet is stored in the memory banks with pointer values 7-18-13-4-8. Taking the first packet as an example, when the first packet arrived to the input port, a request was made to the pointer manager 814 for a fresh head pointer (so that the first packet could begin to be written into the memory banks). At the time the request was processed by the pointer manager 814, a pointer value of "3" was at the head of the free pointer value queue 823; and, in response to the request, the pointer value of "3" was read 901 (along data bus 811) from the free pointer queue RAM 822 and issued to the write hub (at output 815b) so that the first packet could begin to be written into memory.

Eventually, the write hub exhausted the pointer value of "3" and returned it to the pointer manager (at input 815a) as a second request for a pointer for the first packet. At the time this second request was processed by the pointer manager 814, a pointer value of "12" was at the head of the free pointer value queue 822; and in response to this second request, the pointer value of "12" was read from the free pointer queue RAM 822. A pair of uses arose from this reading. First, the pointer value of "12" was issued to the write hub (at output 815b) so that the write hub could continue writing the first packet into the memory banks $307_1$ through $307_4$. Second, the returned pointer value of "3" was used as an address for writing the pointer of value of "12" into the link list RAM 821. As such, after this write, a data value of "12" is stored at address "3" in the link list RAM 821. This explains data entry 1001 in FIG. 10.

In order to write the "next linked to" pointer value of an exhausted pointer value into the link list RAM 821 at the address of the exhausted pointer value, the write channel logic 804 of the link list RAM 821 should have access to: 1) the exhausted pointer (for using as an address along address bus 812); and, 2) the "next linked to" pointer value that appears at the output of the free pointer queue RAM read channel logic 803 (for using as a data value along data bus 813). In the embodiment of FIG. 8, both of these are accounted for as input 815a runs to the address input of the write channel logic 804; and, output 815b runs to the data input of the write channel logic 804. The link list for an entire packet can be constructed using a similar process as that just described above.

Eventually the write hub finished writing the first packet and further pointer values such that no further requests for pointer were made (for the first packet). Here, note that an "End-Of-Packet (EOP)" data value is stored within the link list RAM 821 for the last pointer value used to store pieces of the first packet. Here, some communication should be made to the pointer manager 814 signify to the pointer manager 814 that another pointer is not being requested. In an embodiment, the write hub returns the "last" pointer value needed for a packet to the pointer manager 814; but, the returned "last" pointer value has an extra bit of information appended to it that identifies it as the last pointer value needed for the packet. In response, write channel logic 804 writes an EOP into the link list RAM 821 at the address of the returned "last" pointer value. In alternate embodiments, no such communication between the write hub and the pointer manager needs to be made if the size of the packet is known to the pointer manager (e.g., by including the size of the packet in the request for a fresh head pointer that is received from the request manager 306).

After a packet has been fully written into the memory banks $307_1$ through $307_4$, it remains stored in the memory banks until a grant is received for the packet from the arbiter. Here, the grant includes the head pointer value for the packet (e.g., pointer value "3" for the first packet as observed in FIG. 10). The scheduler 309 schedules a read hub to read the packet from memory, extracts the head pointer from the grant, and forwards it to the scheduled read hub. Upon receipt of the head pointer, the read hub begins to read the packet from the memory banks at the head pointer position; and, in those embodiments where the write hub employs more that one memory address per pointer value, the read hub correspondingly generates the same memory addresses per pointer value. Eventually, the head pointer will be exhausted for the purposes of reading the packet from memory; and, as such, the exhausted head pointer will be forwarded from the read hub to the pointer manager 814.

The return of a pointer value to the pointer manager 814 from a read hub signifies that the packet information that is stored at the returned pointer value's corresponding memory bank location(s) have been read from memory and now represent "stale" information that is free to be written over.

As such, the returned pointer value is written into the tail of the free pointer queue 823. Here, as seen in FIG. 8, in order to convert a pointer value that is returned from a read hub into a next entry into the tail of the free pointer queue 823, the returned pointer value is returned at input 817a so that the write channel logic 802 of the free pointer queue RAM 822 can write the returned pointer value along data bus 808. Note that, as the pointer queue RAM 822 is used to implement a simple FIFO queue, the pointer queue RAM's write channel logic 802 and read channel logic 803 are together responsible for generating the addresses at address busses 809 and 810, respectively, that result in a simple FIFO queue being realized from RAM 822.

The return of an exhausted pointer value from a read hub can also be interpreted as a request for looking up, from the corresponding packet's link list, the next linked to pointer value for the packet. For example, referring briefly to FIG. 10 again, upon the return of the head pointer "3" from the read hub that is reading the first packet from the memory banks, the returned value of "3" is used as a look-up parameter, against the link list for the first packet, so that the next "linked-to" pointer value needed to successfully continue reading the packet from memory ("12") can be retrieved. As such, referring back to FIG. 8, an exhausted pointer value that is returned from a read hub is not only entered at the tail of the free pointer queue; but also, is used as an address for performing a read operation into the link list RAM 821.

As such, according to the pointer manager 814 architecture observed in FIG. 8, the read channel logic 805 of the link list RAM 821 accepts a returned pointer value from a read hub and uses it to form an address that is presented on address bus 812. The next linked to pointer value that is read from the link list RAM in response appears on data bus 820 and is presented at output 817b to the read hub that sent the returned pointer value. The activity of returning an exhausted pointer value to the tail of the free pointer queue and using the exhausted pointer value as a look up parameter for looking up the next linked to pointer value for the continued reading of the packet is represented as the third 903 of the three basic functions 901, 902, 903 of the pointer manager that are shown in FIG. 9.

Note that, for simplicity, the pointer manager 814 embodiment observed in FIG. 8 is on-dimensional in the sense that a single input from a read hub 817a is shown and a single output to a read hub 817b is shown. By contrast, referring to FIG. 3, separate input/outputs RPTR_1 through RTPR_3 317$_1$ through 317$_3$ are shown for each read hub 316$_1$ though 316$_3$. Here, some form of recognition as to which read hub a next linked to pointer value (that was just read from the link list pointer) should be sent to is appropriate; and, some form of correlation can be constructed into the pointer manager 314, 814 so that the next linked to pointer appears at the output that corresponds to the input where the returned pointer value was received (e.g., if a returned pointer value appears at input 317$_1$, the next linked to pointer appears at output 317$_1$). For simplicity a bi-directional communication path is observed between each read hub and the pointer manager. However, each input may also be separate from its corresponding output as suggested by FIG. 8.

Read Operation

Figure 11:
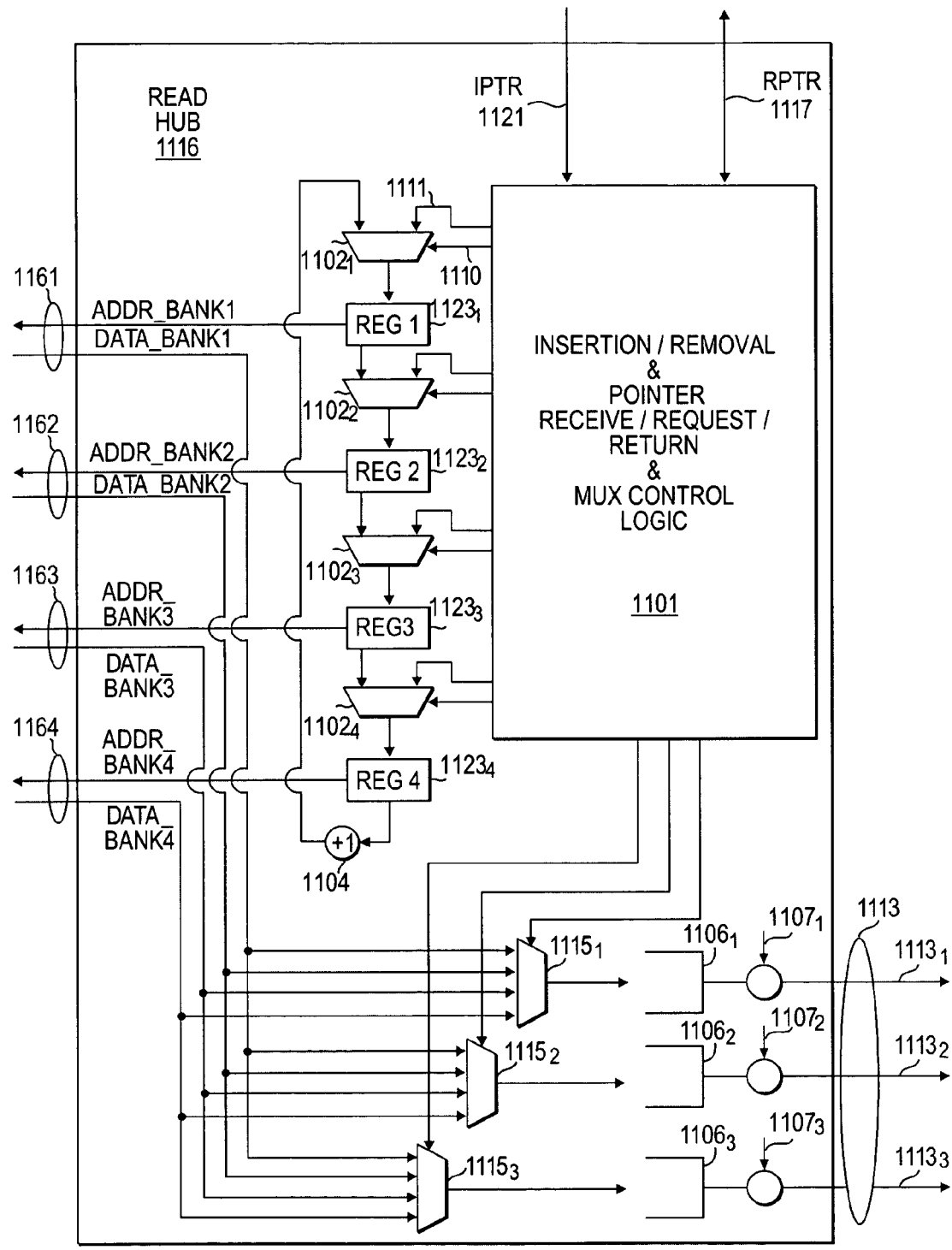
FIG. 11 shows an embodiment of a read hub having a register ring architecture that is capable of operating in a high speed mode or a low speed mode.

FIG. 11 shows a design embodiment for a read hub 1116 that may be used to implement any of the read hubs 316$_1$ through 316$_3$ that are observed in FIG. 3. According to the design approach of FIG. 11, a register ring architecture is used to control the address values that are applied to the memory banks during the reading of information from the memory banks. Here, pointer values are received for each buffers worth of information that is to be read from memory. A pointer value is inserted into the ring and circulates through the ring until the information to be read with the pointer value has been read from the memory banks and stored, as appropriate, into the Tx queues 1106$_1$ through 1106$_3$. After the pointer value has been exhausted (e.g., after each address to be applied from the original pointer value is used), it is removed from the ring (e.g., so that it can be replaced by a "next" linked pointer value so that the packet can continue to be read from memory).

The read hub architecture of FIG. 11 can be adapted to allow the read hub 1116 to support at least a pair of operating modes. For example, according to one embodiment, the read hub 1116 can be configured to operate in either a low speed mode or a high speed mode. Here, and as described above with respect to the operation of the scheduler, different read hub operating speeds result in a different rate at which data is read from memory for a particular packet. For example, in a further embodiment, the low speed mode corresponds to a 1× Infiniband speed (at which packets are read from memory at a speed that is compatible with a 1× Infiniband speed); and, the high speed mode corresponds to a 4× Infiniband speed (at which packets are read from memory at a speed that is compatible a 4× Infiniband speed).

In an even further embodiment, during the low speed mode, the read hub can handle as many as four separate packet streams at a 1× compatible speed of operation (such that the total bandwidth of operation is compatible with a 4× speed); but, during the high speed mode, can handle only one packet stream at a 4× compatible speed of operation. Here, the ability to tweak the speed at which packets are read from memory allows an overall switch to more efficiently manage its internal traffic flows in the sense that both the overloading of low speed outgoing links and the starving of high speed outgoing links should be avoided. A more detailed explanation of the reading process for both a low speed mode and a high speed mode for such an embodiment are discussed immediately below with respect to FIGS. 12a,b and 13a,b, respectively.

a. Low Speed Mode Read Operation

Figure 12A:
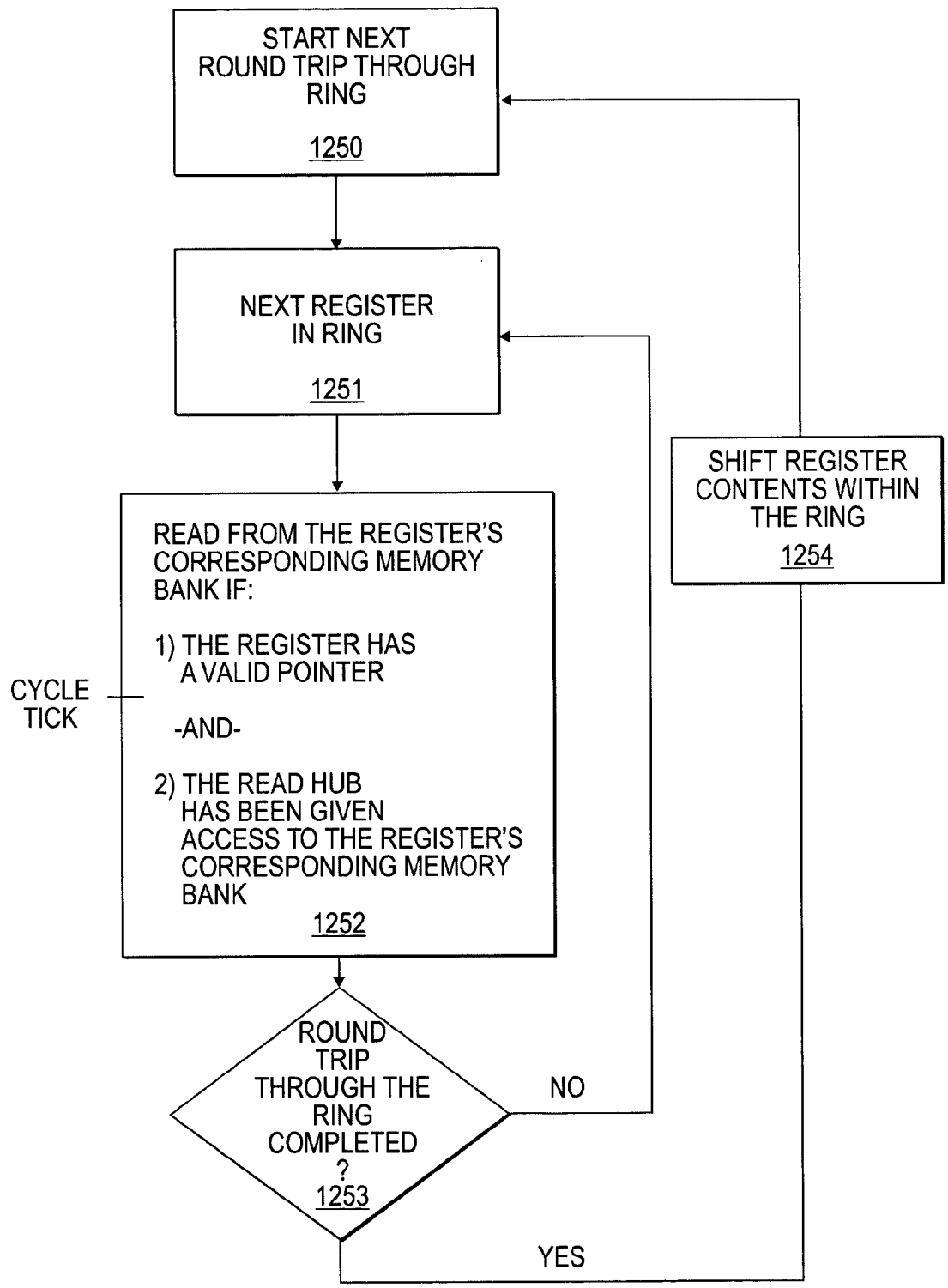
FIG. 12a shows an embodiment of a low speed mode methodology for a read hub having a register ring architecture such as the read hub observed in FIG. 11.
Figure 12B:
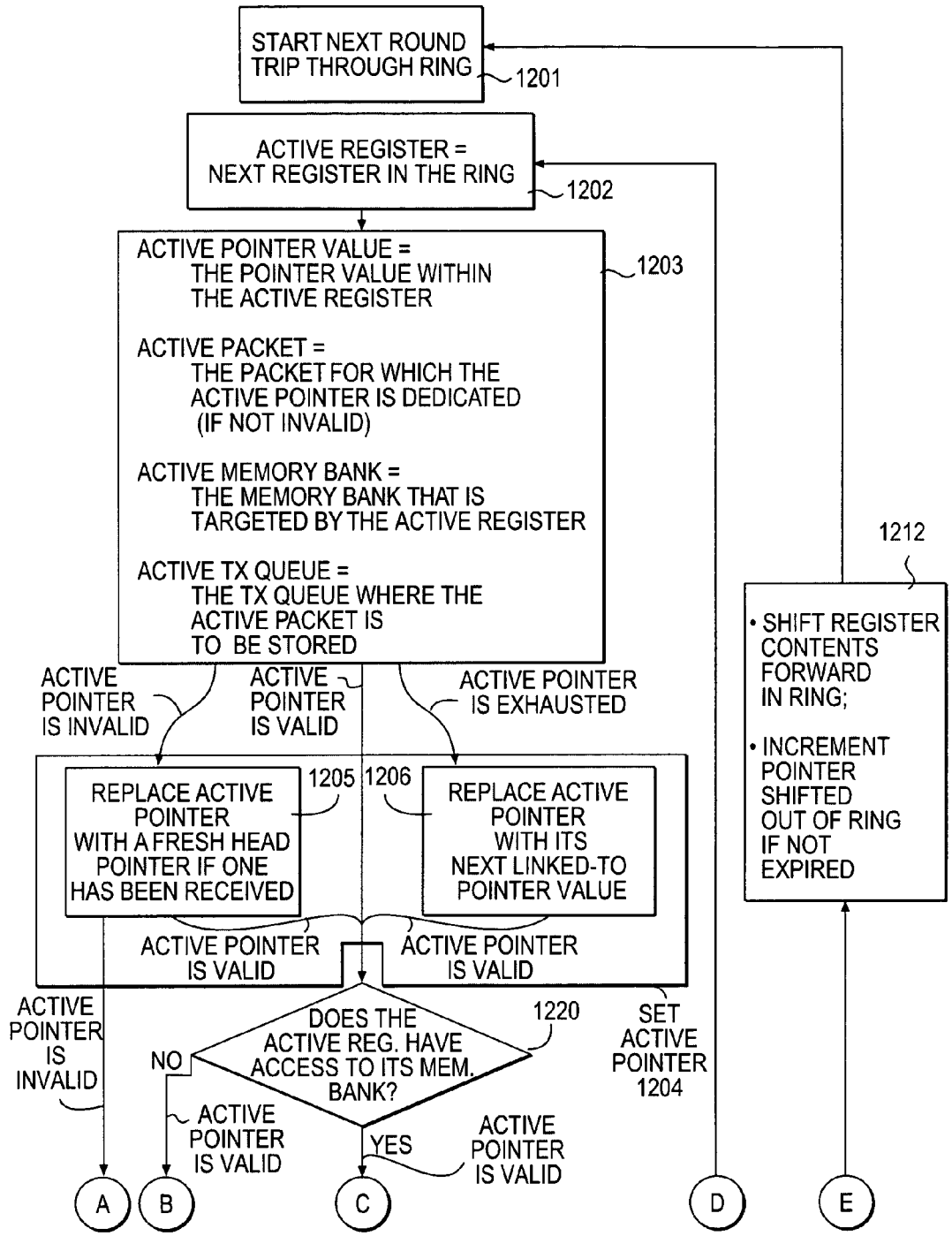
FIG. 12b shows a more detailed embodiment of a low speed mode methodology for a read hub having a register ring architecture such as the read hub observed in FIG. 11.
Figure 12B:
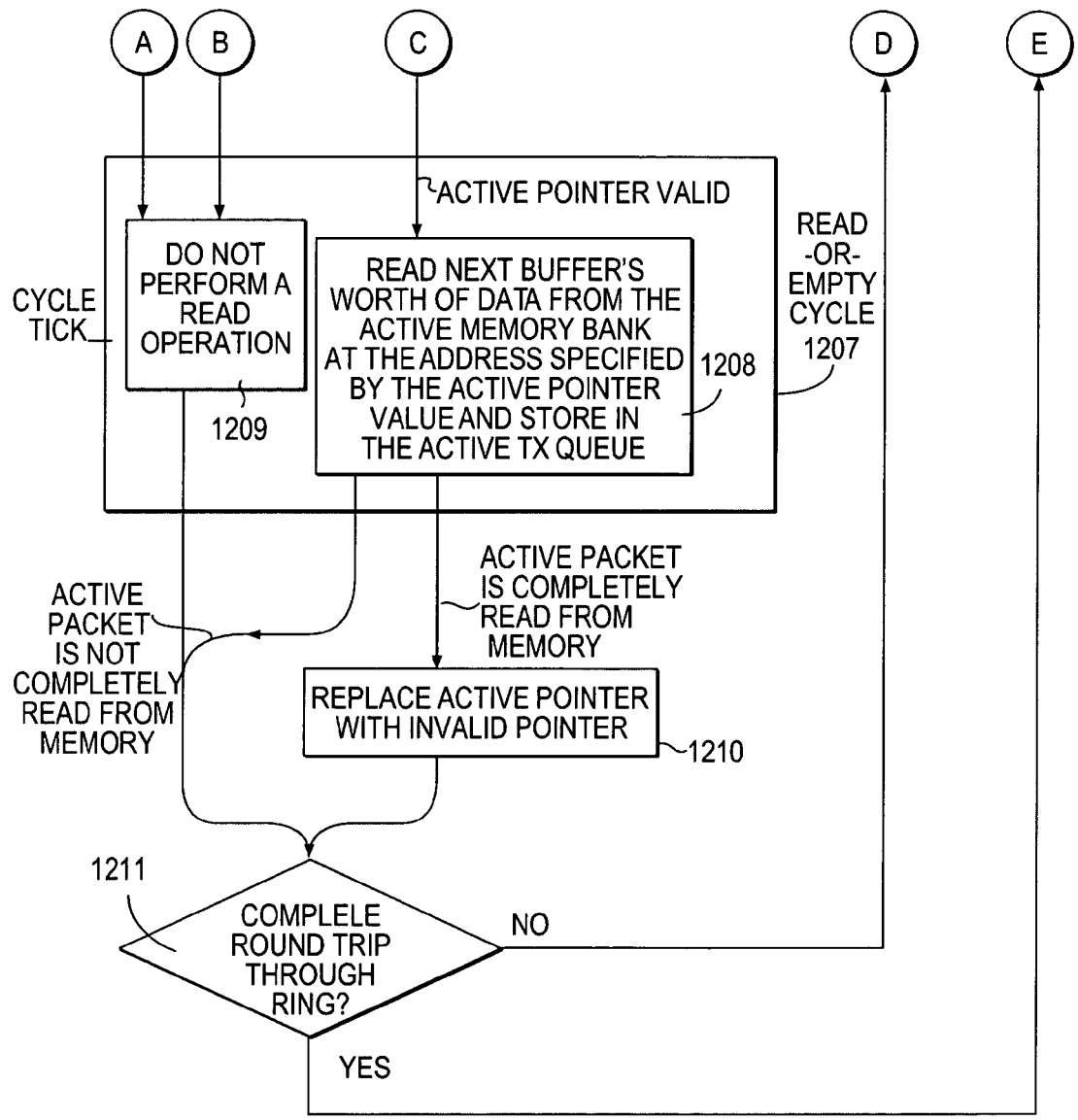

FIGS. 12a and 12b correspond to methodologies that may be used to implement a low speed mode of operation (noting that the methodology of FIG. 12b can be viewed as an embodiment of a more detailed implementation of the methodology of FIG. 12a). Here, according to at least one embodiment, the low speed mode of operation corresponds to a 1× Infiniband speed. Furthermore, as the read hub embodiment 1116 of FIG. 11 is capable of operating in either a high speed mode or a low speed mode, the "extra" bandwidth associated with reading a stream of packets at a low speed rate can be used to read multiple low speed packet streams. For example, according to one approach, while in low speed mode, the read hub is able to separately manage four different packet readings at a 1× compatible speed. As an example, the ability of the read hub 1116 to separately manage the reading of up to four low speed streams of packets is described with respect to FIGS. 6b, 11, 12a and 12b.

FIG. 6b shows an example of the state of a read hub's register contents over the course of sixteen scheduler cycles observed in FIG. 6a. Note that, for the sake of consistency with the example of FIG. 6a, the example of FIG. 6b may be viewed as the low speed operation of Read_Hub_1 316$_1$ of FIG. 3. Better said, as FIG. 6a has scheduled Read_Hub_1 for low speed operation, FIG. 6b can be viewed as an embodiment of the operation of Read_Hub_1 $316_1$ responsive to the scheduling of the scheduler that is observed in FIG. 6a. FIGS. 12a and 12b show methodologies that can be used to describe the operation observed in FIG. 6b. FIG. 6b demonstrates an example of the processing involved while throttling up to four separate low speed traffic streams. Firstly, a brief high level discussion will be provided by reference to FIG. 12a; then, a more detailed discussion of a particular methodology flow will be provided that focuses on the methodology presented in FIG. 12b.

In the combined example of FIGS. 6a and 6b, no reading activity takes places during Cycle 1. However, as of Cycle 2, the scheduler 309 has suddenly scheduled Read Hub_1 as a low speed mode. Referring briefly back to FIG. 5, which shows an embodiment 509 of the scheduler 209, the arrival of a grant from the arbiter for a "first" packet that, according to the grant, is to be read from the memory banks $307_1$ through $307_3$ at a low speed, causes the read demand logic 524 to command the ring control logic 524 to insert the appropriate "Read_Hub_1" data structure into the scheduler's first register ring $526_1$ (e.g., because it is the first register in the scheduler's register ring that is available at Cycle 2). This gives Read_Hub_1 $316_1$ access to the first memory bank $307_1$ at Cycle 2. Here, note that the arrival of a low speed grant into the low speed queue 520 for the first packet corresponds to an embodiment of transition 1105 of FIG. 7. As such, one hub (Read_Hub_1 $316_1$) is identified as a low speed read hub (which corresponds to state 702 of FIG. 7).

As part of the scheduling of Read_Hub_1, the head pointer for the first packet "P1" is extracted from the grant and is forwarded to Read_Hub_1 along communication line/bus IPTR_1 $321_1$, $521_1$. In response, referring to FIGS. 3 and 7, Read_Hub_1 $316_1$, 1116 inserts the pointer value "P1" into register REG1 $1103_1$ in time for Cycle 2. As such, as observed in FIG. 6b, the pointer value P1 has been placed into the REG.1 register as of Cycle 2. According to a low speed mode of operation for the read hub 1116, referring to FIGS. 3, 11 and 12a, another register ring (such as the ring of registers $1123_1$ through $1123_4$ observed in FIG. 11) is used to control the address values presented to each memory bank $307_1$ through $307_4$. That is, referring briefly to FIGS. 3 and 11, the contents of register $1123_1$ (REG. 1) are used to provide a read address to memory bank $307_1$; the contents of register $1123_2$ (REG. 2) are used to provide a read address to memory bank $307_2$; the contents of register $1123_3$ (REG. 3) are used to provide a read address to memory bank $307_3$; and, the contents of register $1123_4$ (REG. 4) are used to provide a read address to memory bank $307_4$.

The read hub 1116 is configured to focus upon 1251 each register in the ring at a rate of one register per cycle (such that, for a particular round trip through the ring, the answer to inquiry 1253 is "no" until the last register in the ring has been focused upon). Here, a focused upon register is a register whose turn it is to generate a read address (noting that, as described in more detail below, a focused upon register may fail to generate a read address during its turn (e.g., if its contents include an invalid pointer).

If, during a cycle when a particular register is being focused upon, the read hub 1116 also happens to be given access to the register's corresponding memory bank (and if the register's contents are deemed to be a valid read address), the read hub reads 1208 a buffer's worth of data from the register's corresponding memory bank and stores it into an appropriate Tx queue (e.g., one of queues $1106_1$ though $1106_3$ as observed in FIG. 11). After the last register in the ring has been focused upon (such that the answer to inquiry 1253 is "yes"), the register contents are shifted 1254 and the entire process repeats 1250.

FIGS. 6b, 11 and 12b may be used to help demonstrate an embodiment of a more detailed approach. Starting at sequence 1201 of FIG. 12b, the hub reading process, for the sake of convenience (and as observed in FIG. 6b at Cycle 2), can be viewed as starting at the first register $1123_1$ in the ring. In an embodiment, an "invalid" pointer value is used to indicate that no reading activity is to occur with a register that is presently storing an invalid pointer. As such, if a read hub is not deemed active by the scheduler, invalid pointer values continuously circulate through the register ring until the scheduler activates the hub (e.g., by sending it a first head pointer). The methodology described with respect to FIG. 12b can be assumed to be within such a state, with respect to the read hub 1116, during Cycle 1 as observed in FIG. 6b.

Here, with register REG. 1 $1123_1$ being the next register in the ring starting from the beginning of the loop, register REG. 1 $1123_1$ becomes the first focused upon or "active" register 1202 within the ring. Some further explanations are presently in order. As will become evident, the circuitry 1101 responsible for controlling the register $1123_1$ through $1123_4$ contents steps through and focuses upon each register in the ring at a rate of one register per cycle. While a particular register is being focused upon, it may be referred to as the "active" register. When a register becomes the active register a set of implications arise. These implications include an "an active pointer value", an "active packet", an "active Tx queue" and an "active memory bank". The active pointer value is found within the contents of the active register and corresponds to an address value used for addressing the register's corresponding memory bank.

The "active memory bank" is the memory bank that is targeted by the active register (i.e., the register's corresponding memory bank (e.g., REG1 corresponds to memory bank $307_1$, etc.). The "active packet" is the packet whose contents are at least partially stored at the "active pointer value" (e.g., as pointer value "P1" is a memory address where the first packet to be granted in FIGS. 6a and 6b is stored). For each subsequent pointer that is fetched (e.g., from the pointer manager) in order to read a portion of the same packet, all of these pointers can be said to have the same active packet. The "active Tx queue" is the Tx queue (e.g., one of Tx queues $1106_1$ through $1106_4$) where the portions of the active packet are enqueued after they have been read from memory.

Continuing with an approach were four separate addresses evolve from the head pointer provided by scheduler (and each subsequent pointer for a packet as provided by the pointer manager), once four separate reads have been made from each memory bank, the pointer value is "exhausted" (because no further reads can be made from it) and the next-linked to pointer value (from the exhausted pointer value) has to be received from the pointer manager so that addresses sufficient for four more reads can be made. This operation has been described above with respect to the operation of the pointer manager. An invalid pointer value may be marked with an extra bit within the register space that is used to signify that no read is take place. Note that, under inactive conditions (i.e., no packets are waiting to be read by a read hub), no reading activity will take place from the memory banks $307_1$ through $307_4$. As such, the register's $1123_1$ through $1123_4$ will circulate invalid pointer values to ensure that no reading activity takes place.

Recalling that the example of FIG. 6b can be assumed to with such a state at Cycle 1, and recognizing that the active register for Cycle 2 is register $1123_1$, note that methodology of FIG. 12b leads to sequence 1205 because the invalid pointer presently within register $1123_1$ needs to be replaced with the first packet's head pointer "P1" in order to commence the reading of the first packet. The replacement of the invalid pointer with the valid pointer "P1" causes the head pointer "P1" to be written into register $1123_1$. Note that the register ring includes a first multiplexer $1102_1$ whose output determines the contents of the first register $1123_1$. Here, in order to implement sequence 1205, the register ring control logic 1101: 1) places the head pointer value "P1" on the first multiplexer input channel 1111; and, 2) manipulates the channel select input 1110 so that the fresh head pointer value "P1" is written into the first register $1123_1$. Cycle 2 of FIG. 6b corresponds to this state because a value of "P1" is observed for the REG.1 register $1123_1$ during Cycle 2. With the invalid pointer value having been replaced 1205 with the valid head pointer value "P1", the methodology flows to sequence 1220 (because the active pointer is now valid).

Sequence 1220 indicates that a read only takes place if the active register has been given access to the active memory bank. From the discussion of FIG. 6a, recall that the scheduler unit 309 is responsible for determining during which cycles the read hub $316_1$ will have access to a particular memory bank. This access, for each of the instances provided in FIG. 6b, is shown in FIG. 6a. That is, Read_Hub_1 $316_1$ only has access to memory bank 1 $307_1$ during Cycles, 2, 6, 10, 14, etc; memory bank 2 $307_2$ during Cycles 3, 7, 11, 15, etc., etc. Exactly when Read_Hub_1 $316_1$ has been given access to a particular memory bank has been indicated in FIGS. 6b through the use of shaded regions. That is, if a region is shaded in FIG. 6b, Read_Hub_1 has access to the memory bank during the cycle that the shaded region corresponds to. Here, note that the shaded regions of FIGS. 6b merely correspond to the scheduling properties of FIG. 6a being superimposed upon the read hub ring activity of FIGS. 6b.

As such, sequence 1220 of FIG. 12b effectively tests whether or not the active register has been given access to its corresponding memory bank. If not, no read operation takes place 1209 and the cycle becomes an empty read cycle (i.e., no reading from memory takes place); if so, the next buffer's worth of information is read 1208 from the active memory bank and is placed into the active Tx queue. Referring to FIG. 6b, note that the active register REG 1 $1123_1$ does have access to its corresponding memory bank (memory bank $307_1$) during Cycle 2; and, as such, the first buffer of information for the first packet is read 1208 from memory bank $307_1$ at address "P1". Assuming that the active Tx queue for the first packet is Tx queue $1106_1$, note that part of the reading process for the first packet involves correctly manipulating the read port multiplexer $1115_1$ that feeds Tx queue $1106_1$. Here, each read port multiplexer $1115_1$ through $1115_4$ is used to properly couple its corresponding Tx queue to any of the memory banks as appropriate.

In an embodiment, the contents of the active register (e.g., active register $1123_1$ in the present case) not only include the active pointer value (e.g., "P1") but also include an identification of the Tx queue into which the portions of the packet that are read with the active pointer value are to be enqueued into. Here, the contents of the register are used not only to present an address read value; but also, to control the channel select line of the corresponding read port multiplexer. For example, with respect to the read that occurs in Cycle 2 of FIG. 6b, a first portion of the contents of register REG1 $1123_1$ are directed along the memory bank 1 address bus ADDR_BANK_1 (which is drawn as an output from REG1 $1123_1$) and a second portion of the contents of register REG1 $1123_1$ are used to manipulate the channel select line of multiplexer $1115_1$ (where no such output from the register has been drawn for simplicity); where, the second portion effectively corresponds to a value that identifies the proper Tx queue (e.g., "00" if Tx queue 1 $1103_1$ is the Tx queue where the portions of the packet being reads are stored; "01" if Tx queue 2 $1103_2$ is the Tx queue where the active packet is stored; etc.).

Note that these first and second portions (i.e., pointer value and Tx queue identifier) may "ride" through the ring together with one another so that whenever a read is to actually take place from a particular register, the correct Tx queue can be immediately identified along with the address value to be used for the read. Note that read hub input/outputs 1161 through 1164 of FIG. 11 correspond to read hub input/outputs 361 through 364 of FIG. 3. Here, a complete input/output for a memory read includes both the address and the data to be read. FIG. 3 is drawn simplistically to suggest that a single multiplexer $308_1$ through $308_3$ is used to channel both the data from and the address to their respective memory banks $307_1$ through $307_4$. Although such a design is possible, it is also possible to use a pair of multiplexers for each memory bank $307_1$ through $307_4$—one multiplexer for propagating address signals and a second multiplexer for propagating data.

Continuing with the example then of FIG. 6b and referring to FIG. 12b, after the first buffer has been read 1208 from memory bank 1, the next active register (register REG2 $1123_2$) is focused upon as the active register 1202, 1103 for the following cycle (Cycle 3). Here, because the packet can be assumed to be more than four buffer's worth of information, more than four reads are to be made from the memory banks in this example. As such, sequence 1210 is avoided and the answer to inquiry 1211 is "no" because the present round trip through the ring has not been completed. As a blank region in the chart of FIG. 6b corresponds to the placement of an invalid pointer in the corresponding register space, FIG. 6b indicates that the contents of the second register REG2 $1123_2$ in the ring include an invalid pointer during Cycle 3. Because the example of FIG. 6b corresponds to a situation where a fresh head pointer for another low speed packet has not been received by Read_Hub_1 as of Cycle 3, during Cycle 3, the process flows through the "invalid pointer" paths of sequences 1205 and 1209. As such, no read activity takes place during Cycle 3.

As of Cycle 4, however, a grant for a second packet requiring a low speed transmission rate has been received by the scheduler 309 and the head pointer P2 for that packet has been entered into the register ring of Read_Hub_1. Because the scheduler 309 has already activated Read_Hub_1 $316_1$ in low speed mode (to handle the first packet), and because a read hub in low speed mode can handle the reading of as many as four separate 1× speed packets, the scheduler 309 will recognize that Read_Hub_1 $316_1$ has the capacity to handle the reading of the second low speed packet. Here, referring briefly to FIG. 5, note that the scheduler 509 may make reference to the state register $523_1$ for Read_Hub_1 to recognize not only that Read_Hub_1 has been configured into low speed mode; but also, that Read_Hub_1 is currently entertaining the reading of only one low speed packet and can therefore entertain the reading of the second low speed packet.

In a further embodiment, the grant for a packet not only informs the scheduler of the proper speed at which the packet should be read from memory; but also, informs the scheduler of which memory bank is the packet's "starting"

memory bank. Here, referring to FIG. 3, the write hub 305 may be configured to allow an incoming packet to start to be written into whichever memory bank (amongst memory banks $307_1$ through $307_4$) happens to be first available for writing into. A patent application describing such as write hub entitled "APPARATUS AND METHODOLOGY FOR A WRITE HUB THAT SUPPORTS HIGH SPEED AND LOW SPEED DATA RATES", filed concurrently, U.S. patent application Ser. No. 10/431,875, now U.S. Pat. No. 7,124,241.

As such, if the packet is to be correctly read from memory (i.e., where the buffers are read from memory in the proper order), the first buffer's worth of information for a packet should be the first information read for the packet. As such, the first read for a packet should be made from the particular bank where the first buffer for the packet was written. In order to convey this information, the grant for a packet includes information that identifies which memory bank has the packet's first buffer.

In response to this information, and by reference to the appropriate read hub's state register, in an embodiment, the scheduler is configured to provide the appropriate read hub with the head pointer for the packet so as to allow the packet to begin to be read from its appropriate "starting" memory bank. For example, according to one approach, the scheduler recognizes when a register within the register ring of the read hub will be both: 1) scheduled to have access to the packet's starting memory bank; and, 2) will be available to receive the head pointer for the packet. As a consequence of conditioning the timing of the issuance of a head pointer to a read hub based upon these factors, by inserting the head pointer into the register that corresponds to the starting memory bank in time to perform a read operation from it while the register has access to the starting memory bank, the first buffer of a packet is guaranteed to be read from its proper "starting" memory bank. In such a case, according to the example of FIG. 6b, the first packet (whose head pointer is P1) has memory bank $307_1$ as its starting memory bank. As such, the head pointer P1 was entered into register REG1 $1103_1$ for the cycle (Cycle 2) when REG1 $1103_1$ had access to the first packet's starting memory bank $307_1$. Similarly, the head pointer P2 was entered into register REG3 $1103_3$ for the cycle (Cycle 4) when REG3 $1103_3$ had access to the second packet's starting memory bank $307_3$.

Referring to FIGS. 6b and 12b, at Cycle 4, the process runs through sequences 1205 and 1208. The subsequent cycle (Cycle 5) is an empty cycle 1209. After Cycle 5 has been executed, the answer to inquiry 1211 will be "yes". That is, after Cycle 5, each register will have had a turn as being recognized as the active register; and, as such, a complete run-through the ring will have been completed. As such, between Cycles 5 and 6, the contents of the registers REG1 through REG4 $1123_1$ through $1123_4$ are shifted 1212 forward in the ring by one register unit (i.e., the contents of register REG1 $1123_1$ are shifted into register REG2 $1123_2$; the contents of register REG2 $1123_2$ are shifted into register REG3 $1123_3$; etc.). Note that because the pointer value being shifted out of register REG4 $1114_4$ and into REG1 $1114_1$ is an invalid pointer, the pointer value does not need to be incremented. Incrementing a valid and non exhausted pointer value that has been shifted out of the last register REG4 in the ring is a technique that allows for the generation of more than one address per pointer value that is received from the pointer manager 314 as described below.

Referring still to FIG. 6b, observe that Cycle 6 is an empty cycle for Read_Hub_1 because REG1 has the invalid pointer (that was shifted into REG1 from REG4 between Cycles 5 and 6). During Cycle 7 a read for the first packet with pointer value P1 is made from memory bank $307_2$. Now, referring to FIGS. 6a and 6c, note that a grant for third packet (which happens to be a high speed packet and whose starting memory bank is memory bank $307_1$) arrives in time to begin to be read at Cycle 7 from memory bank $307_1$. Note that, from FIG. 6a, the scheduler has identified Read_Hub_2 $316_2$ as the read hub that will be responsible for reading the third packet (as represented by the placement of a "Read_Hub_2" data structure into the scheduler's register as seen in FIG. 6a). Furthermore, the scheduler has issued the head pointer for the third packet "P2" to Read_Hub_2 $316_2$ in time for it to be entered into register REG1 $1123_1$ so that a read can take place from the third packet's starting memory bank $307_1$ during Cycle 7. More details regarding the reading of high speed packets is provided in a following sub-section.

A grant for a fourth packet (which happens to be a low speed packet and whose starting memory bank is memory bank $307_3$) is received by the scheduler in sufficient time such that the packet can begin to be read as of Cycle 8. Again, because the scheduler 309 has already activated Read_Hub_1 $316_1$ in low speed mode, and because a read hub in low speed mode can handle the reading of as many as four separate 1× speed packets, the scheduler 309 will recognize that Read_Hub_1 $316_1$ has the capacity to handle the reading of the fourth packet. As such, the head pointer for the fourth packet P4 is issued to Read_Hub_1 and entered into REG3 $1123_3$ so that an initial read for the fourth packet (from the starting memory bank $307_3$) can take place during Cycle 8. During Cycle 9, a second read for the second packet takes place. After Cycle 9, another round trip through the register ring takes place and the contents of the register ring are shifted forward. Here, a buffer is read for each of the three low speed packets; and, note that a fourth low speed packet is scheduled and begins to read from its starting memory bank $307_2$ during Cycle 11. Thus, as of Cycle 11 and the following cycles observed in FIG. 6b, the full capacity of Read_Hub_1 $316_1$ has been reached.

After Cycle 17 has been completed (which is not shown in FIG. 6b), the pointer value "P1" will be shifted 1212 out of register $1123_4$. Here, even though the value "P1" has been used to write to each memory banks $307_1$ through $307_4$, recall that a scheme may be used to derive more than one address value per pointer value received from the pointer manager 314. According to the embodiment of FIG. 11, an incrementer 1104 is used to increment 1214 the value removed from register $1107_4$ by one (i.e., "+1"). Here, consistent with discussions provided in prior sections, in an embodiment, pointer values issued by the pointer manager (such as the value "P1") take the form XXX . . . XX00. That is, the least significant bits are of the form "00". Upon the rotation of the initial pointer value P1 out of the last register 1 $123_4$ after Cycle 17, the least significant pair of bits are incremented from "00" to "01".

Here, referring to FIG. 6b, this means that while Cycles 2 through 17 use an address value of P1 having the form XXX . . . XX00 within the ring, Cycles 18 through 33 will use an address value within the ring of P1 having the form XXX . . . XX01 where the same binary representation is used for the higher order content XXX . . . XX through Cycles 2 through 33. Moreover, the same XXX . . . XX content is used as a basis for pointer value P1 (=XXX . . . XX10) used within the ring during Cycles 34 through 49 and pointer value P1* (=XXX . . . XX11) used within the ring during Cycles 50 through 65. After Cycle 65, however, the basis content XXX . . . XX of the pointer value P1 will be exhausted requiring a fresh pointer from the pointer manager. Note that this will cause the methodology of FIG. 12b to flow through sequence 1206 during Cycle 66, wherein, the pointer value P1*** is replaced 1206 by the next pointer value that the pointer manager has link listed to pointer P1.

Before commencing with a discussion of high speed mode operation, referring to FIG. 12b, note that the register ring control logic 1101 may be configured to replace 1210 a valid pointer value with an invalid pointer value once the packet for which the valid pointer was dedicated is completely read from memory. That is, once a packet is completely read from memory, there is no need for one of its valid pointer values to be circulated within the ring. As such, its pointer value can be replaced with an invalid pointer value after its packet has been completely read from memory. Here, replacing a valid pointer with an invalid pointer is particularly useful if there are no other packets waiting to be immediately read from memory. In a further embodiment, the register ring control logic 701 may be designed to replace a pointer value for a completely read packet with a fresh head pointer for the next packet waiting to be read that has an appropriate starting memory bank (e.g., the same starting memory bank that the active register corresponds to). Note that the ring control logic 1101 can recognize that a packet has been completely read from memory when an end of packet EOP parameter is received from the pointer manager. Alternatively, if the read hub is informed of the size of the packet (e.g., by passing the size of the packet along with the packet's head pointer within the grant from the arbiter; which, in turn, are both forwarded to the appropriate read hub).

b. High Speed Mode Operation

Figure 13A:
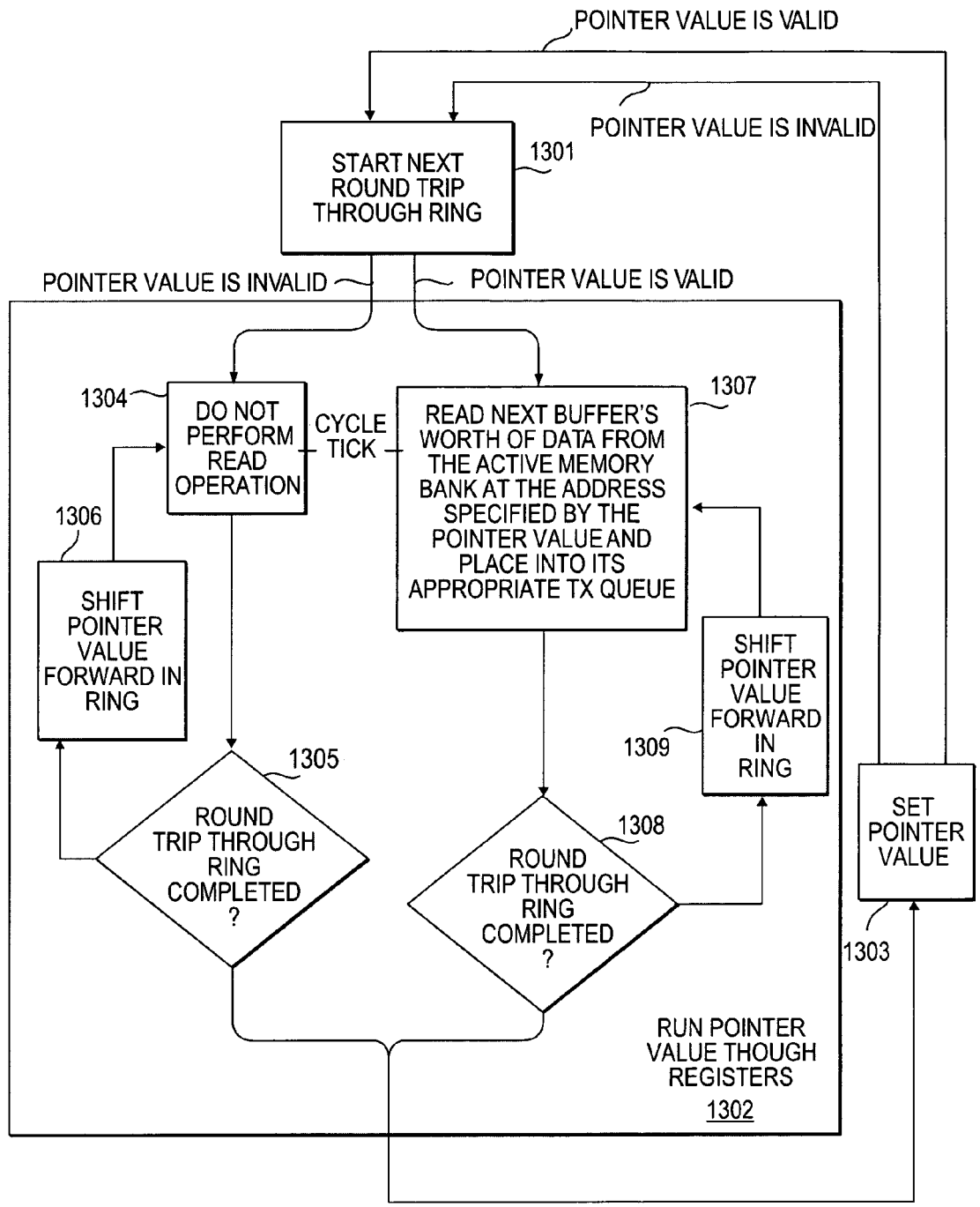
FIG. 13a shows an embodiment of a high speed mode methodology for a read hub having a register ring architecture such as the read hub observed in FIG. 11.
Figure 13B:
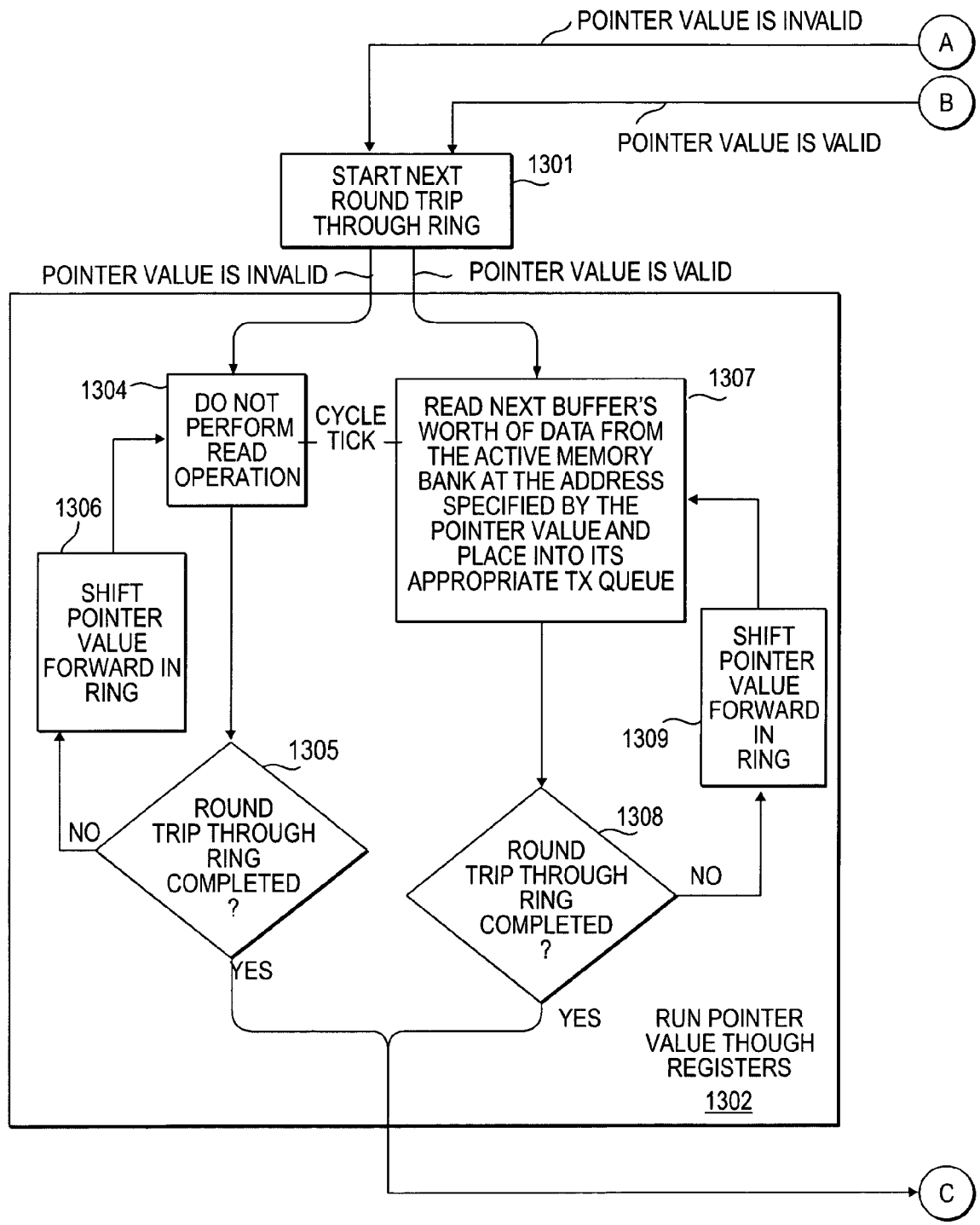
FIG. 13b shows an embodiment of a high speed mode methodology for a read hub having a register ring architecture such as the read hub observed in FIG. 11.
Figure 13B:
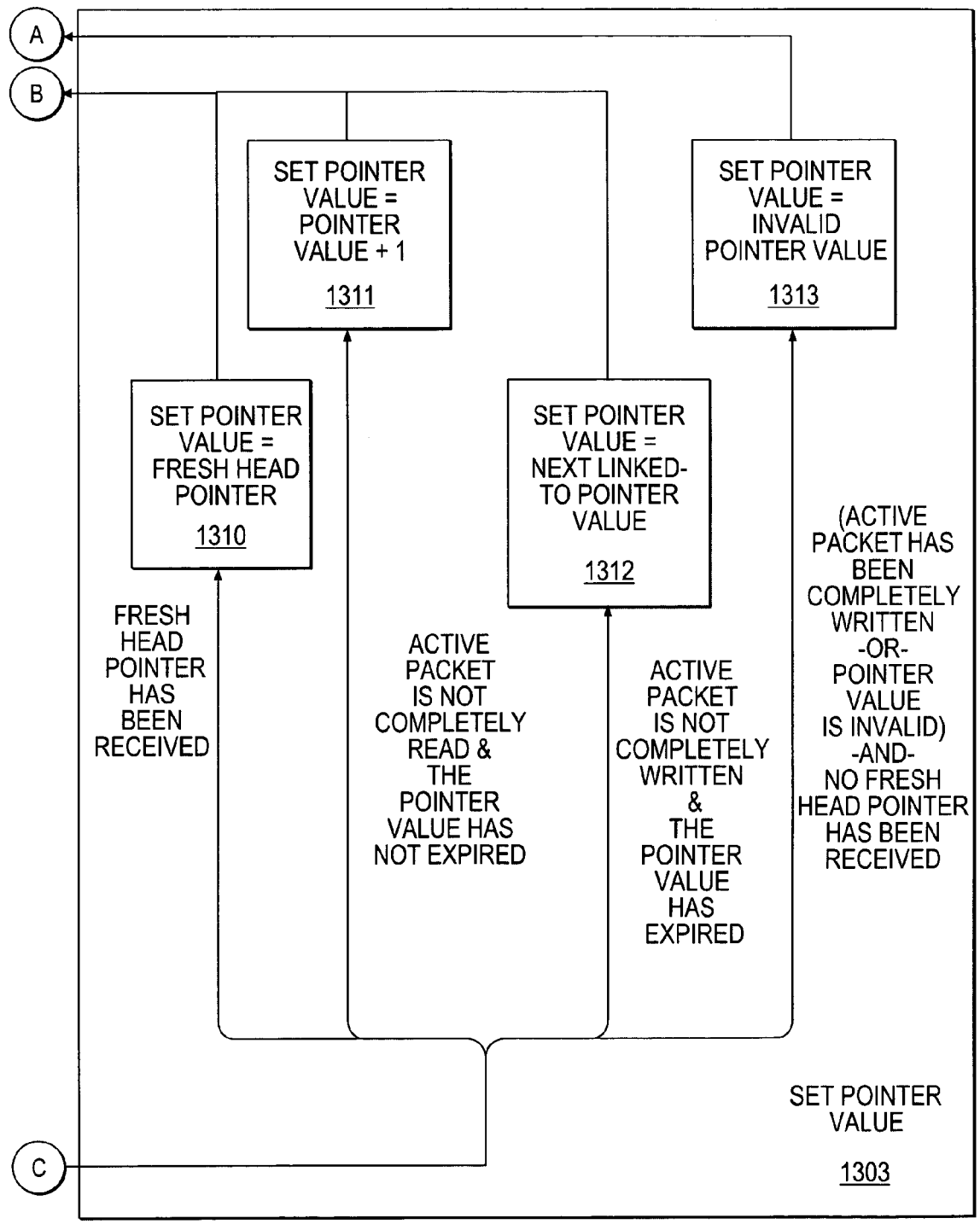

Referring to FIG. 3, the above discussion related to the low speed operation of a read hub. Recall, however, that a read hub (in various embodiments) may be configured to support high speed operation as well. In an embodiment, high speed operation corresponds to a 4× Infiniband speed. Recall from the discussion in the preceding section that FIG. 6c shows the state of the register ring over the course of 16 consecutive cycles in high speed mode for Read_Hub_2 $316_2$; and, that Read_Hub_2 begins to read a packet at Cycle 7. Here, FIGS. 13a and 13b show a high level embodiment and a more detailed embodiment, respectively, of a methodology that may be used to control the operation of a read hub during high speed mode. Referring to FIGS. 6c and 13a, note that one valid pointer value exists in the ring at any time; and, the register contents are shifted once per cycle (rather than once per four cycles as observed in FIGS. 6b and 6c). This difference in operation effectively converts the processing of the read hub toward a single packet (as such, only one pointer is in the ring at a time) that is operating at four times the speed of a low speed link (hence one shift per cycle) as compared to the low speed mode operation of the hub.

That is, note that the packet that pointer "P3" refers to in FIG. 6c enjoys a read from memory every cycle whereas the packet that pointer "P1" referred to in FIG. 6b enjoys a read from memory once every four cycles (on average). As such, the packet being read in FIG. 6c is being read at four times the speed of the packet(s) being read in FIG. 6b. According to the methodology of FIG. 13a, starting at the beginning of the ring at register REG1 $1123_1$, the pointer value that is entered at the start of the ring completes a round trip through the ring at a rate of one shift per cycle. As observed in the methodology of FIG. 13a, whether or not the round trip through the ring is spent idling 1304, 1305, 1306 (i.e., no reads) or reading at a rate of one read per cycle 1307, 1308, 1309 (as observed in FIG. 6c) depends upon whether or not the pointer value is invalid or valid. Each time a round trip 1301 through the ring is completed (e.g., the pointer value is shifted out of the last register REG4 $1123_4$), the pointer value for the next round trip through the ring is determined 1303.

FIG. 13b elaborates in more detail on one approach for determining the pointer value for each round trip through the ring. Note that the term "active packet" corresponds to a packet that was being read during the immediately prior round trip through the ring. According to the approach of FIG. 13b, the pointer value is set to a new head pointer 1310 if a new head pointer is received from the scheduler. The pointer value is incremented 1311 if the active packet has not yet been completely read from memory and the pointer value is not yet exhausted. The pointer value is set to the next linked-to pointer value for the packet 1312 if the active packet has not yet been completely read from memory and the pointer value is exhausted. The pointer value is set to an invalid pointer value 913 if the active packet has been completely written from memory and a fresh head pointer for a next packet has not been received.

Lastly, note that the embodiments discussed above with respect to FIGS. 13a and 13b may be construed so as to correspond to an approach where a high speed mode read must start with the first register $1123_1$ in the register ring (i.e., a packet's head pointer must first be used from register $1123_1$ of FIG. 11 during high speed mode). It is important to realize that alternative embodiments may be readily engineered where a packet may begin to be read from a register other than the first register in the ring (and therefore may first begin to be read from any of the memory banks rather than only a particular memory bank) through slight modification of the low speed methodology observed in FIGS. 12a and 12b.

In particular, FIG. 12a can be modified to describe a "read first from any bank" high speed mode hub simply by removing sequence 1254 (so that the "yes" output of sequence 1253 directly feeds sequence 1250) and inserting sequence 1254 between sequences 1252 and 1253 (so that sequence 1252 feeds sequence 1254; and, sequence 1254 feeds sequence 1253). Moreover, FIG. 12b can be modified to describe a more detailed implementation of a "read first from any bank" high speed mode hub simply by moving sequence 1212 to just prior to sequence 1211 in the observed method flow (to ensure that the register contents are shifted once per cycle tick regardless if a read operation is 1208 or is not 1209 performed). Moreover, for a read hub capable of handling the reading of only a single packet at a time it should be understood that only a single valid pointer should be in the ring.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a pointer manager, comprising:
   a) write circuitry to enter, into a queue that is implemented with a first memory, a pointer value that a read hub has exhausted the use of;
   b) read circuitry to remove, from said queue, a pointer value that is to be sent to a write hub;
   c) write circuitry to add, to a link list that is maintained with a second memory, said pointer value that is to be sent to said write hub; and,
   c) read circuitry to obtain, from said link list, a pointer value that is to be sent to a read hub.

2. The apparatus of claim 1 wherein said pointer value that is to be sent to said write hub can be either a head pointer value or a next linked to pointer, wherein, said head pointer value is the first pointer value used to write a packet into a plurality of memory banks, and wherein, said next linked to pointer is a pointer value used to write a packet into said plurality of memory banks other than a first pointer value used to write a packet into said plurality of memory banks.

3. The apparatus of claim 1 further comprising an address bus and a data bus coupled between said write circuitry to enter and said first memory.

4. The apparatus of claim 3 further comprising another address bus and data bus coupled between said read circuitry to remove and said first memory.

5. The apparatus of claim 1 further comprising an address bus and a data bus coupled between said write circuitry to add and said second memory.

6. The apparatus of claim 5 further comprising another address bus and data bus coupled between said read circuitry to obtain and said second memory.

7. The apparatus of claim 1 further comprising request circuitry to request said read circuitry to remove to remove a pointer value from said queue that is to be sent to a write hub, said request circuitry having a first input to receive a request for a fresh head pointer, said request circuitry having a second input to receive an exhausted pointer from said write hub.

8. An apparatus, comprising:
   a read hub capable of reading a packet from a plurality of memory banks comprising:
   a plurality of registers, each one of said registers to help generate a read address to a different one of said memory banks, each of said registers arranged in a ring so that each register can pass a pointer value toward a next register within said ring, said ring of registers further comprising a multiplexer between each of said registers, each multiplexer having an output path that flows toward a next register within said ring relative to said multiplexer, each multiplexer to introduce a pointer value to said ring at said next register within said ring; and
   a pointer manager, comprising:
   a) write circuitry to enter, into a queue that is implemented with a first memory, a pointer value that a read hub has exhausted the use of;
   b) read circuitry to remove, from said queue, a pointer value that is to be sent to a write hub;
   c) write circuitry to add, to a link list that is maintained with a second memory, said pointer value that is to be sent to said write hub;
   c) read circuitry to obtain, from said link list, a pointer value that is to be sent to a read hub.

9. The apparatus of claim 8 wherein said pointer value that is to be sent to said write hub can be either a head pointer value or a next linked to pointer, wherein, said head pointer value is the first pointer value used to write a packet into a plurality of memory banks, and wherein, said next linked to pointer is a pointer value used to write a packet into said plurality of memory banks other than a first pointer value used to write a packet into said plurality of memory banks.

10. The apparatus of claim 8 further comprising an address bus and a data bus coupled between said write circuitry to enter and said first memory.

11. The apparatus of claim 10 further comprising another address bus and data bus coupled between said read circuitry to remove and said first memory.

12. The apparatus of claim 8 further comprising an address bus and a data bus coupled between said write circuitry to add and said second memory.

13. The apparatus of claim 12 further comprising another address bus and data bus coupled between said read circuitry to obtain and said second memory.

14. The apparatus of claim 8 further comprising request circuitry to request said read circuitry to remove to remove a pointer value from said queue that is to be sent to a write hub, said request circuitry having a first input to receive a request for a fresh head pointer, said request circuitry having a second input to receive an exhausted pointer from said write hub.

15. The apparatus of claim 8 wherein said read hub is capable of reading a packet from said memory banks within either of a high speed read mode or a low speed read mode.

16. The apparatus of claim 15 wherein when said read hub is within said low speed mode said read hub:
   1) for every cycle of operation: focuses upon a next register within said ring; and,
   2) for every N cycles of operation: together shifts forward, by one register position within said ring, all pointer values within said ring, wherein, N is the number of registers within said ring.

17. The apparatus of claim 16 wherein, when a particular register is focused upon by said low speed mode read hub, a read operation is performed at the particular memory bank that said focused upon register is to help generate a read address for if:
   1) said low speed mode read hub has been given access to said particular memory bank; and
   2) said focused upon register is holding a valid pointer value.

18. The apparatus of claim 17 wherein whether or not said read hub has been given access to said particular memory bank is controlled by a scheduler unit.

19. The apparatus of claim 18 wherein said scheduler further comprises a second plurality of registers arranged in a ring, each one of said registers from said second plurality of registers corresponding to a different one of said memory banks and to control access to its corresponding memory bank.

20. The apparatus of claim 17 wherein, as part of said focus being placed upon said focused upon register, said low speed mode read hub replaces said valid pointer value with an invalid pointer value if a packet for whom said valid pointer was devoted is completely read from said memory banks as a consequence of said read operation.

21. The apparatus of claim 17 wherein, when a particular register is focused upon by said low speed mode read hub, said low speed mode read hub replaces an invalid pointer value with a fresh head pointer value within said focused upon register if:
   1) said focused upon register contains an invalid pointer; and,
   2) a head pointer has been received for a packet for whom said head pointer is devoted.

22. The apparatus of claim 21 wherein after said invalid pointer value is replaced with said head pointer value within said focused upon register, a read operation is performed from the particular memory bank that said focused upon register is to help generate a read address for if said low speed mode read hub has been given access to said particular memory bank by said scheduler.

23. The apparatus of claim 17 wherein, when a particular register is focused upon by said low speed mode read hub, said low speed read mode hub replaces the pointer value within said focused upon register with a next linked-to pointer if said pointer value within said focused upon register is exhausted, said next linked-to pointer devoted to the same packet that said exhausted pointer value was devoted to.

24. The apparatus of claim 23 wherein said register ring further comprises an incrementer between a pair of consecutive registers within said ring, said incrementer to increment a pointer value for each round trip taken through said ring, said pointer value having a plurality of lower order bits reserved for being incremented by said incrementer, said pointer value deemed exhausted when a read address has been generated with each unique combination of said lower order bits.

25. The apparatus of claim 23 wherein after said exhausted pointer value is replaced with said next linked-to pointer value within said focused upon register, a read operation is performed from the particular memory bank that said focused upon register is to help generate a read address for if said low speed mode read hub has been given access to said particular memory bank.

26. The apparatus of claim 15 wherein said low speed mode read hub can simultaneously handle N different packets that are each to be sent through a switch core before being transmitted upon a different low speed link.

27. The apparatus of claim 26 wherein said low speed links are Infiniband 1× links.

28. The apparatus of claim 27 wherein N=4.

29. The apparatus of claim 15 wherein a said high speed read mode hub:
   circulates one valid pointer value within said ring, said one valid pointer value shifted forward to a next register within said ring for each cycle of operation to cause one read address to be generated per cycle of operation, each read address targeted at the particular memory bank that said next register holding said valid pointer value is to help generate a read address for.

30. The apparatus of claim 29 wherein said high speed mode read hub increments said one valid pointer and circulates said incremented pointer value through said ring if:
   1) said one valid pointer value is not yet deemed an exhausted pointer value; and,
   2) a packet for whom said one valid pointer value was devoted is not completely read from said memory banks.

31. The apparatus of claim 29 wherein said high speed mode read hub replaces, within said ring, said one valid pointer value with a next linked to pointer value if:
   1) one valid pointer value is deemed an exhausted pointer value; and,
   2) a packet for whom said one valid pointer value was devoted is not completely read from said memory banks.

32. The apparatus of claim 29 wherein said high speed mode read hub replaces, within said ring, said one valid pointer value with an invalid pointer value if a packet for whom said one valid pointer was devoted is:
   1) completely read from said memory banks; and,
   2) a head pointer for another packet to be read from said memory banks has been received by said high speed mode read hub.

33. The apparatus of claim 29 wherein said high speed mode read hub can handle the reading of one packet that is to be sent through a switch core and transmitted upon a high speed link.

34. The apparatus of claim 33 wherein said high speed link is an Infiniband high speed link.

35. The apparatus of claim 34 wherein said high speed link is a 4× Infiniband high speed link.

36. A method, comprising:
   entering into a queue that is implemented with a first memory, a pointer value that a read hub has exhausted the use of;
   removing from said queue, a pointer value that is to be sent to a write hub;
   adding to a link list that is maintained with a second memory, said pointer value that is to be sent to said write hub; and,
   obtaining from said link list a pointer value that is to be sent to a read hub.

37. The method of claim 36 wherein said pointer value that is to be sent to said write hub is a fresh head pointer value.

38. The method of claim 37 further comprising, after said head pointer value is sent to said write hub, writing a first piece of a packet into a memory bank with said head pointer value.

39. The method of claim 37 further comprising, prior to said removing, requesting that said fresh head pointer be sent to said write hub.

40. The method of claim 36, wherein, said pointer value that is to be sent to said write hub is a next linked to pointer value.

41. The method of claim 40 further comprising, after said next linked to pointer value is sent to said write hub, writing a first piece of a packet into a memory bank with said head pointer value.

42. The method of claim 41 further comprising, prior to said removing, requesting that said next linked to pointer value be sent to said write hub.

43. The method of claim 42 wherein said requesting further comprises sending an exhausted pointer value from said write hub to a pointer manager that performs said removing.

44. The method of claim 36 further comprising, at said read hub that receives said pointer value obtained from said link list:
 circulating said pointer value obtained from said link list within a ring of registers, each one of said registers to help generate a read address to a different memory bank amongst a plurality of memory banks.

45. The method of claim 44 wherein said pointer value obtained from said link list is a head pointer value.

46. The method of claim 44 wherein said pointer value obtained from said link list is a next linked to pointer value.

47. The method of claim 44 further comprising incrementing said pointer value obtained from said link list between a pair of said registers to create a next read address that is derived from said pointer value.

48. The method of claim 44 further comprising replacing within said ring a pointer value derived from said pointer value obtained from said link list with a next linked to pointer value because said pointer value obtained from said link list is deemed exhausted.

49. The method of claim 44 further comprising shifting said pointer value forward within said ring once for every N cycles of operation, wherein, said ring has N registers, and wherein said read hub is configured to be in said low speed mode.

50. The method of claim 44 further comprising shifting said pointer value forward within said ring once for every cycle of operation, wherein, said read hub is configured to be within a high speed mode.

* * * * *

UNITED STATES PATENT AND TRADEMARK OFFICE
CERTIFICATE OF CORRECTION

| | | |
|---|---|---|
| PATENT NO. | : 7,330,927 B1 | Page 1 of 1 |
| APPLICATION NO. | : 10/431991 | |
| DATED | : February 12, 2008 | |
| INVENTOR(S) | : Rick Reeve et al. | |

It is certified that error appears in the above-identified patent and that said Letters Patent is hereby corrected as shown below:

Column 29, Line 31 (Approx.), Claim 1, delete "c)" and insert -- d) --;

Column 29, Line 54, Claim 7, after "to remove" delete "to remove";

Column 30, Line 16, Claim 8, delete "c)" and insert -- d) --;

Column 30, Line 39, Claim 14, after "to remove" delete "to remove".

Signed and Sealed this

Eighth Day of June, 2010

David J. Kappos
*Director of the United States Patent and Trademark Office*